US007567357B2

(12) United States Patent
Kato et al.

(10) Patent No.: US 7,567,357 B2
(45) Date of Patent: Jul. 28, 2009

(54) INK JET RECORD APPARATUS

(75) Inventors: Tokunori Kato, Ichinomiya (JP); Shozo Kabeya, Gamagori (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 920 days.

(21) Appl. No.: 10/892,374

(22) Filed: Jul. 16, 2004

(65) Prior Publication Data

US 2005/0012776 A1 Jan. 20, 2005

(30) Foreign Application Priority Data

Jul. 18, 2003 (JP) ............................ 2003-277140

(51) Int. Cl.
*G06F 15/00* (2006.01)
*B41J 29/38* (2006.01)

(52) U.S. Cl. ........................................ 358/1.14; 347/11

(58) Field of Classification Search ................ 358/1.14, 358/1.16, 474; 347/7, 11, 17, 23, 14, 60, 347/87, 108, 109; 400/88; 396/571-572
See application file for complete search history.

(56) References Cited

U.S. PATENT DOCUMENTS 5,758,040 A 5/1998 Ichimura et al.
5,764,864 A 6/1998 Sujita
6,091,515 A 7/2000 Kimura
6,128,104 A 10/2000 Okabe et al.
6,247,784 B1 * 6/2001 Obana et al. .................. 347/37
6,906,811 B1 * 6/2005 Teradaira et al. ........... 358/1.13
2001/0038410 A1 * 11/2001 Kubota et al. ............... 347/108
2002/0078149 A1 * 6/2002 Chang et al. ................ 709/203

FOREIGN PATENT DOCUMENTS

| | | |
|---|---|---|
| JP | A 04-131247 | 5/1992 |
| JP | A 06-106719 | 4/1994 |
| JP | A 8-204863 | 8/1996 |
| JP | A 8-214096 | 8/1996 |
| JP | A 9-55812 | 2/1997 |
| JP | A 10-56526 | 2/1998 |
| JP | A 10-70625 | 3/1998 |
| JP | A 10-181045 | 7/1998 |
| JP | A 10-193628 | 7/1998 |
| JP | A 10-336410 | 12/1998 |
| JP | A 11-007342 | 1/1999 |
| JP | A 2001-148751 | 5/2001 |
| JP | A 2001-205898 | 7/2001 |
| JP | A 2001-238001 | 8/2001 |
| JP | A 2002-094707 | 3/2002 |
| JP | A 2002-103591 | 4/2002 |

* cited by examiner

*Primary Examiner*—Saeid Ebrahimi Dehkordy
(74) *Attorney, Agent, or Firm*—Oliff & Berridge, PLC

(57) ABSTRACT

An ink jet record apparatus has a record head that ejects ink from a nozzle to form an image on a record medium, a maintenance portion that executes maintenance operation to prevent drying of the nozzle at regular time intervals when image formation is not executed, a first mode setting portion that sets the ink jet record apparatus on a usual power mode in which usual power is consumed or a power saving mode in which power supply to other parts than those required for returning to the usual power mode is reduced, and a second mode setting portion that sets the ink jet record apparatus on a permission mode in which the maintenance operation and predetermined operation other than the maintenance operation are permitted or an inhibition mode in which the predetermined operation is inhibited although the maintenance operation is permitted during the power saving mode.

24 Claims, 14 Drawing Sheets

※) CI INTERRUPT IS EFFECTIVE ONLY WHEN FAX RECEIVE MODE IS ON

INK JET RECORD APPARATUS

BACKGROUND OF THE INVENTION

1. Field of the Invention

This invention relates to an ink jet record apparatus including a record head for ejecting ink from a nozzle to form an image on a record medium and more particularly to an ink jet record apparatus that can switch between a usual power mode in which a CPU is active and is ready to execute various types of operation and a power saving mode in which power supply to other parts than those required for returning to the usual power mode is reduced and initialization such as setting of ports is required in returning to the usual power mode.

2. Description of the Related Art

Hitherto, an ink jet record apparatus including a record head for ejecting ink from a nozzle to form an image on a record medium and maintenance portion for executing maintenance operation at regular time intervals to prevent drying of the nozzle when image formation is not performed has been known. In this kind of ink jet record apparatus, the record head ejects ink from a nozzle to form an image on a record medium such as record paper. If remaining ink deposited on the nozzle solidifies as it is, when an attempt is made to form another image, ink is not well ejected from the nozzle. Then, when image formation is not performed for some time, the maintenance portion executes the maintenance operation at regular time intervals to prevent drying of the nozzle.

This kind of ink jet record apparatus can be designed to switch between a usual power mode in which a CPU is active and is ready to execute various types of operation and a power saving mode in which power supply to other parts than those required for returning to the usual power mode is reduced and initialization such as setting of ports is required in returning to the usual power mode for switching into the power saving mode in the nighttime, etc. However, it is desirable that the maintenance operation should also be executed at regular time intervals while the ink jet record apparatus switches into the power saving mode. Then, an art is proposed wherein the record apparatus is once returned to the usual power mode at a predetermined timing during the power saving mode and makes a transition to the power saving mode again after the maintenance operation is executed. (For example, refer to JP-A-2002-103591.)

As a trigger for releasing the power saving mode, various triggers such as the reception time of CI (Call Indicator) if the ink jet record apparatus is a facsimile machine are proposed in addition to the maintenance operation timing. (For example, refer to JP-A-9-55812.)

JP-A-2002-103591 and JP-A-9-55812 are referred to as a related art.

However, in the ink jet record system, unlike a laser record system or a thermal record system, if the ink jet record apparatus is disconnected from the commercial power by removing the cord from an outlet, etc., when it is not used for a long term, the maintenance operation as described above is made impossible and if the cord is again plugged in an outlet, etc., for supplying the commercial power, it is feared that the ink jet record apparatus may be unable to print normally.

Thus, a method of usually energizing the record apparatus at all times and entering a standby mode in the power saving mode with low power consumption as described above is adopted. In this method, however, various interrupts (internal sensor, timer, external input, etc.,) are monitored to return from the power saving mode to the usual power mode and therefore if the user simply opens the cover carelessly, the record apparatus returns from the power saving mode to the usual power mode; this is a problem.

The record apparatus stands by in the usual power mode until it again enters the power saving mode after the expiration of a given time and thus meanwhile the power is wasted; this is also a problem.

In a facsimile machine having a software power key for setting the machine as if power were turned off, some users may desire the machine to behave as the power is off (remain in the non-operation state unless the power key is turned on). However, if the software power key is turned off, when a ringing signal is received from a LAN line or a telephone line or an interrupt is detected, the machine returns to the usual power mode and thus the desire cannot be accomplished; this is also a problem.

Of course, some users may desire the machine to return to the usual power mode as a ringing signal is received or any other interrupt is detected; however, all desires cannot be satisfied in the configuration in the related art.

SUMMARY OF THE INVENTION

Such problems are assumed to occur in any apparatus other than the facsimile machine and there is a possibility that similar problems will also occur in a network printer, etc., for example. It is therefore the object of the invention to enable the user to specify whether or not predetermined operation other than maintenance operation is permitted during a power saving mode in an ink jet record apparatus.

The invention provides an ink jet record apparatus having: a record head that ejects ink from a nozzle to form an image on a record medium; a maintenance portion that executes maintenance operation to prevent drying of the nozzle at regular time intervals when image formation is not executed; a first mode setting portion that sets the ink jet record apparatus on a usual power mode in which usual power is consumed or a power saving mode in which power supply to other parts than those required for returning to the usual power mode is reduced; and a second mode setting portion that sets the ink jet record apparatus on a permission mode in which the maintenance operation and predetermined operation other than the maintenance operation are permitted or an inhibition mode in which the predetermined operation is inhibited although the maintenance operation is permitted during the power saving mode.

Therefore, when the first mode setting portion switches the ink jet record apparatus into the power saving mode, power supply to other parts than those required for returning to the usual power mode in which usual power is consumed can be reduced. The user can use the second mode setting portion to set the permission mode in which the maintenance operation and predetermined operation other than the maintenance operation are permitted or the inhibition mode in which the predetermined operation is inhibited although the maintenance operation is permitted during the power saving mode. Thus, the permission mode is set by the second mode setting portion, the maintenance operation and the predetermined operation other than the maintenance operation are permitted during the power saving mode. On the other hand, if the inhibition mode is set by the second mode setting portion, the predetermined operation is inhibited although the maintenance operation is permitted during the power saving mode.

Thus, the permission mode is set by the second mode setting portion, the maintenance operation and the predetermined operation other than the maintenance operation can be permitted during the power saving mode. On the other hand, if the inhibition mode is set by the second mode setting portion, the predetermined operation can be inhibited although the maintenance operation is permitted during the power saving mode. Therefore, the user can specify whether or not the predetermined operation other than the maintenance operation is permitted during the power saving mode as he or she desires.

The invention also provides a mode switching method of switching a mode of an ink jet record apparatus which executes maintenance operation to prevent drying of a nozzle when image formation is not executed, involving the steps of: determining whether the ink jet record apparatus is set to either a usual power mode in which usual power is consumed or a power saving mode in which power supply to other parts than those required for returning to the usual power mode is reduced; determining, during the power saving mode, whether the ink jet record apparatus is set to either a permission mode in which the maintenance operation and predetermined operation other than the maintenance operation are permitted or an inhibition mode in which the predetermined operation is inhibited although the maintenance operation is permitted during the power saving mode; recognizing a first interrupt to execute the maintenance operation and a second interrupt to execute the predetermined operation; switching from the power saving mode to a temporary return mode in which the maintenance operation and the predetermined operation can be executed, the temporary return mode being different from the usual power mode, only if the first interrupt or the second interrupt is recognized during the permission mode; and switching from the power saving mode to the temporary return mode only if the first interrupt is recognized during the inhibition mode.

The invention also provides a mode setting program configured to operate a computer as: a record head that ejects ink from a nozzle to form an image on a record medium; a maintenance portion that executes maintenance operation to prevent drying of the nozzle at regular time intervals when image formation is not executed; a first mode setting portion that sets the ink jet record apparatus on a usual power mode in which usual power is consumed or a power saving mode in which power supply to other parts than those required for returning to the usual power mode is reduced; and a second mode setting portion that sets the ink jet record apparatus on a permission mode in which the maintenance operation and predetermined operation other than the maintenance operation are permitted or an inhibition mode in which the predetermined operation is inhibited although the maintenance operation is permitted during the power saving mode.

DETAILED DESCRIPTION OF THE PREFERRED EMBODIMENTS

Figure 1:
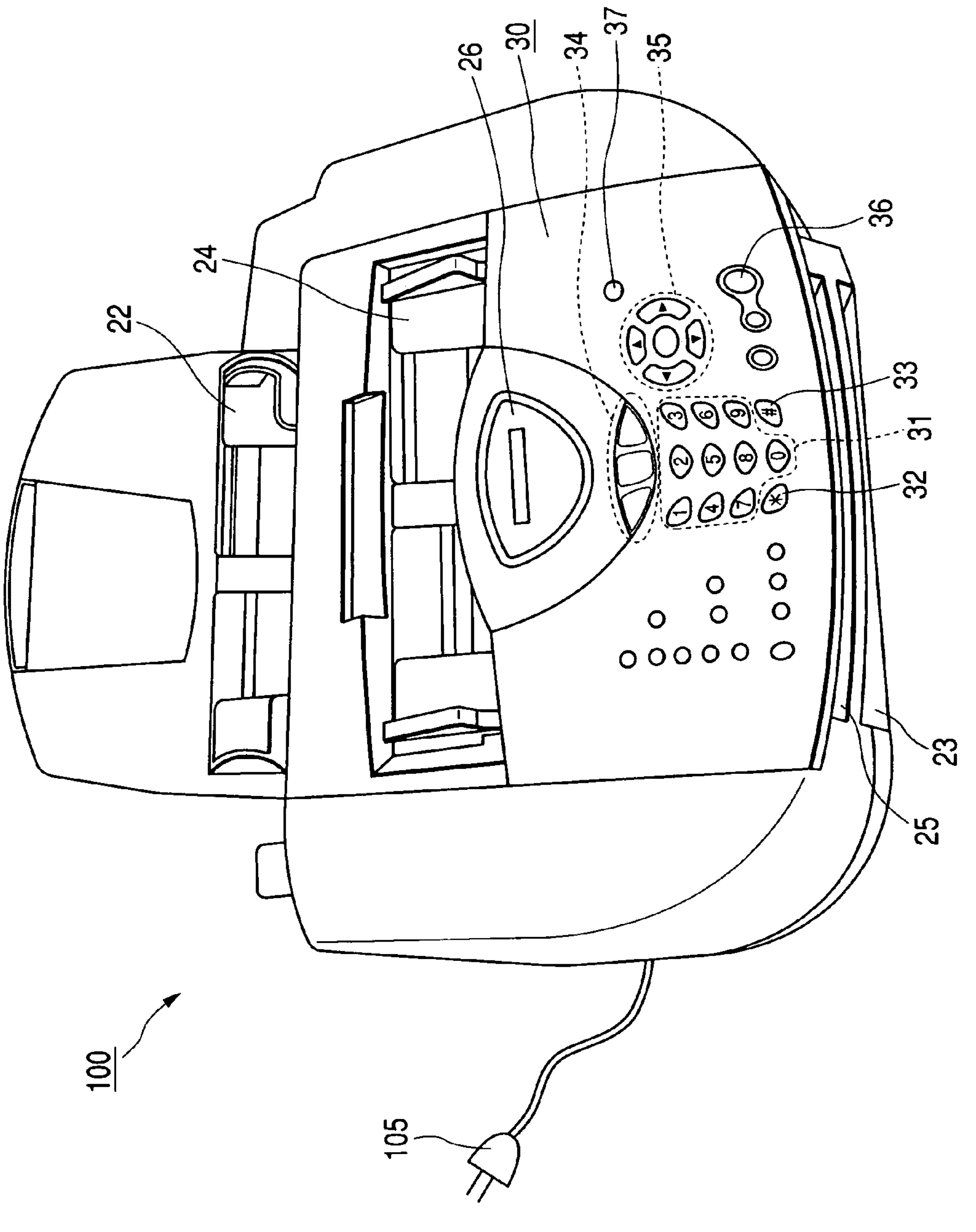
FIG. 1 is a perspective view to show the appearance of a multifunction processing machine.
Figure 2:
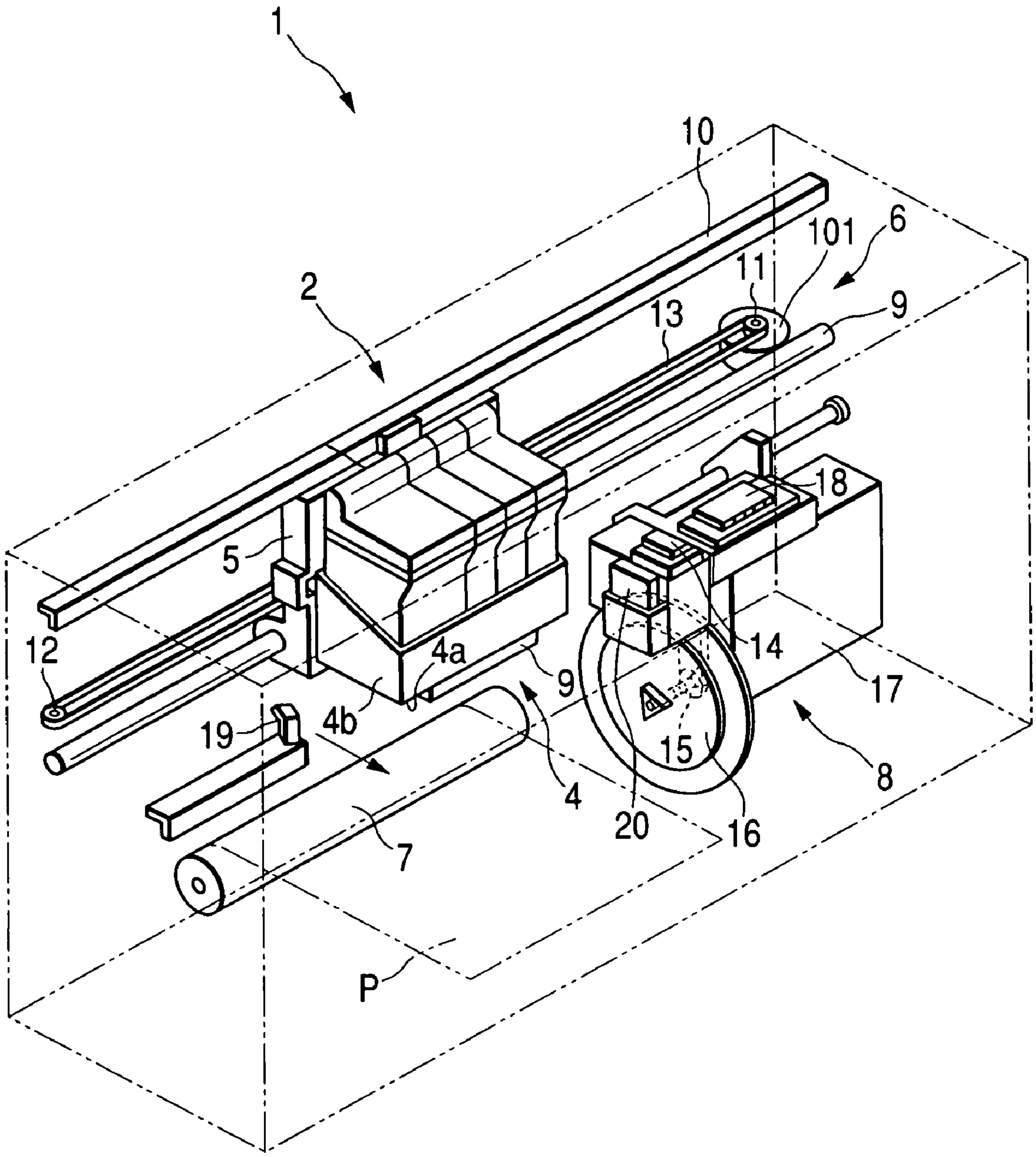
FIG. 2 is a perspective view to show the configuration of an image formation portion incorporated in the multifunction processing machine.

Referring now to the accompanying drawings, there is shown a preferred embodiment of the invention. FIG. 1 is a perspective view to show the appearance of a multifunction processing machine 100 as an ink jet record apparatus incorporating the invention. FIG. 2 is a perspective view to show the configuration of an image formation portion 1 incorporated in the multifunction processing machine 100. The multifunction processing machine 100 is an apparatus having functions of a printer, a copier, a scanner, and a facsimile.

To begin with, the configuration of the image formation portion 1 will be discussed based on FIG. 2. As shown in the figure, the image formation portion 1 includes a head unit 4 including a record head 3 for ejecting ink onto record paper P (corresponding to a record medium) to form an image thereon, a carriage 5 on which ink cartridges 2 and the head unit 4 are mounted, a drive unit 6 for causing the carriage 5 to reciprocate in a linear direction, a platen roller 7 extended in the reciprocating direction of the carriage 5 and placed facing the record head 3, a purge unit 8 as maintenance portion, and a sensor 19 (described later). In the embodiment, the sensor 19 is fixedly placed in the image formation portion 1. Three partition plates (not show) are placed upright on a placement portion **4*a* of the head unit 4, and the placement portion 4*a* is divided into placement parts of four ink cartridges 2 through the three partition plates between a pair of side covers 4*b* formed on both sides of the placement portion 4*a***. Black, cyan, magenta, and yellow ink cartridges are placed in the four placement parts.

The drive unit 6 is made up of a carriage shaft 9 placed in the lower end part of the carriage 5 and extended in parallel with the platen roller 7, a guide plate 10 placed in the upper end part of the carriage 5 and extended in parallel with the carriage shaft 9, two pulleys 11 and 12 placed in both end parts of the carriage shaft 9 between the carriage shaft 9 and the guide plate 10, and an endless belt 13 is placed on the pulleys 11 and 12.

As one pulley 11 is rotated forward and reversely by driving of the carriage motor 101, the carriage 5 jointed to the endless belt 13 is caused to reciprocate in the linear direction along the carriage shaft 9 and the guide plate 10.

Record paper P is fed from a print paper feed portion 22 (later described with reference to FIG. 1) provided at the back of the image formation portion 1 and is introduced into the nip between the record head 3 and the platen roller 7. After ink is ejected onto the record paper P from the record head 3 to form an image on the record paper p in a predetermined manner, the record paper P is ejected from a print paper ejection portion 23 (later described with reference to FIG. 1) to the outside of the multifunction processing machine 100.

The purge unit 8 is provided on a side of the platen roller 7; it is placed so as to face the record head 3 when the head unit 4 is at a reset position. The purge unit 8 includes a purge cap 14 for abutting against openings of a plurality of nozzles of the record head 3 (not shown) so as to cover the nozzles, a suction pump 15, and a cum 16, and an ink reservoir 17. When the head unit 4 is at the reset position, the nozzles of the record head 3 is covered with the purge cap 14 and defective ink containing bubbles, etc., accumulating in the record head 3 is sucked by the suction pump 15 driven by the cum 16, thereby recovering the record head 3. The sucked defective ink is stored in the ink reservoir 17. The cum 16 is driven by a purge motor 102 (see FIG. 3), and the suction pump 15 applies negative pressure responsive to the rotation speed of the purge motor 102 to the record head 3.

A wiper member 20 adjacent to the purge unit 8 is disposed at a position of the purge unit 8 on the platen roller 7 side thereof. The wiper member 20 is formed like a spatula for wiping the nozzle face of the record head 3 with a move of the carriage 5. To prevent drying of ink, a cap 18 covers the nozzles of the record head 3 returned to the reset position upon completion of image formation.

The image formation portion 1 includes the optical sensor 19 disposed so that light is applied non-perpendicularly to the light application face of the ink cartridge 2 to decrease a noise signal (unnecessary reflected light) from the light application face of the ink cartridge 2, and compares the reflected light amount detected by the sensor 19 with a threshold value to detect the ink remaining amount in each ink cartridge 2 and identify the ink cartridge 2. The ink remaining amount is also estimated by an ink remaining amount dot counter (corresponding to detection portion) described later and is used for various types of control.

Next, as shown in FIG. 1, on the outer periphery of the multifunction processing machine 100, the print paper feed portion 22 is disposed at the rear of the main unit; a read paper feed portion 24 is disposed at the rear of the top of the main unit; the print paper ejection portion 23 and a read paper ejection portion 25 are disposed on the front of the main unit; a display panel 26 is disposed at the center of the top face of the main unit; and an operation panel 30 is disposed on the front of the top of the main unit.

The operation panel 30 is made up of digit buttons of 0 to 9, an * button 32, a # button 33, a function button 34 to switch the function to be used (among the copy function, the scanner function, and the facsimile function), a set button 35 for setting for each function, a start button 36, a software power key 37 as a software power key, and the like.

The software power key 37 is a key for supplying power only to the extremely limited parts such as the panel and a RTC (real time clock) for making the machine appear to be in a state in which the power is not on rather than a hardware switch for physically disconnecting the multifunction processing machine 100 from 100-V commercial power. If the software power key 37 is turned off, an LCD, etc., does not produce display and thus the machine can be made to appear as if it did not operate.

The image formation portion 1 described above is a component for printing an image on paper while transporting the paper set in the print paper feed portion 22 to the print paper ejection portion 23. A scanner portion 40 incorporated in the multifunction processing machine 100 (see FIG. 3) is a component for reading an image printed on an original while transporting the original set in the read paper feed portion 24 to the read paper ejection portion 25.

Next, the configuration of a control system of the multifunction processing machine 100 will be discussed with FIG. 3. A control portion 50 includes a CPU 51, ROM 52, RAM 53, NVRAM 54, a PC interface portion (PCI/F) 55, an NCU (network control unit) 56, and the like, which are connected by a bus 57. Connected to the bus 57 are the record head 3, the sensor 19, the display panel 26, the operation panel 30, the scanner portion 40, the carriage motor 101, the purge motor 102, an LF motor 103, a power controller 58, and the like. The LF motor 103 is provided for driving the platen roller 7, etc., to transport the record paper P.

The CPU 51 sends commands to the components of the multifunction processing machine 100 via the bus 57 while storing the processing result in the RAM 53 or the NVRAM 54 in accordance with a processing procedure previously stored in the ROM 52, thereby controlling the whole operation of the multifunction processing machine 100. Provided in the RAM 53 is a POWER OFF mode exit flag storage area 53*a* for storing a POWER OFF mode exit flag used in processing described later. Provided in the NVRAM (nonvolatile RAM) 54 are a FAX RECEIVE mode flag storage area 54*a* for storing a FAX RECEIVE mode flag used in processing described later and a power mode information flag storage area 54*b* for storing a power mode information flag. The PC interface portion 55 is an interface for connecting the multifunction processing machine 100 to another known personal computer (PC) via a communication cable so as to enable data communications therebetween. The NCU 56 is an interface for connecting the multifunction processing machine 100 to a telephone network (corresponding to a communication line), and corresponds to connection portion and reception portion.

Figure 3:
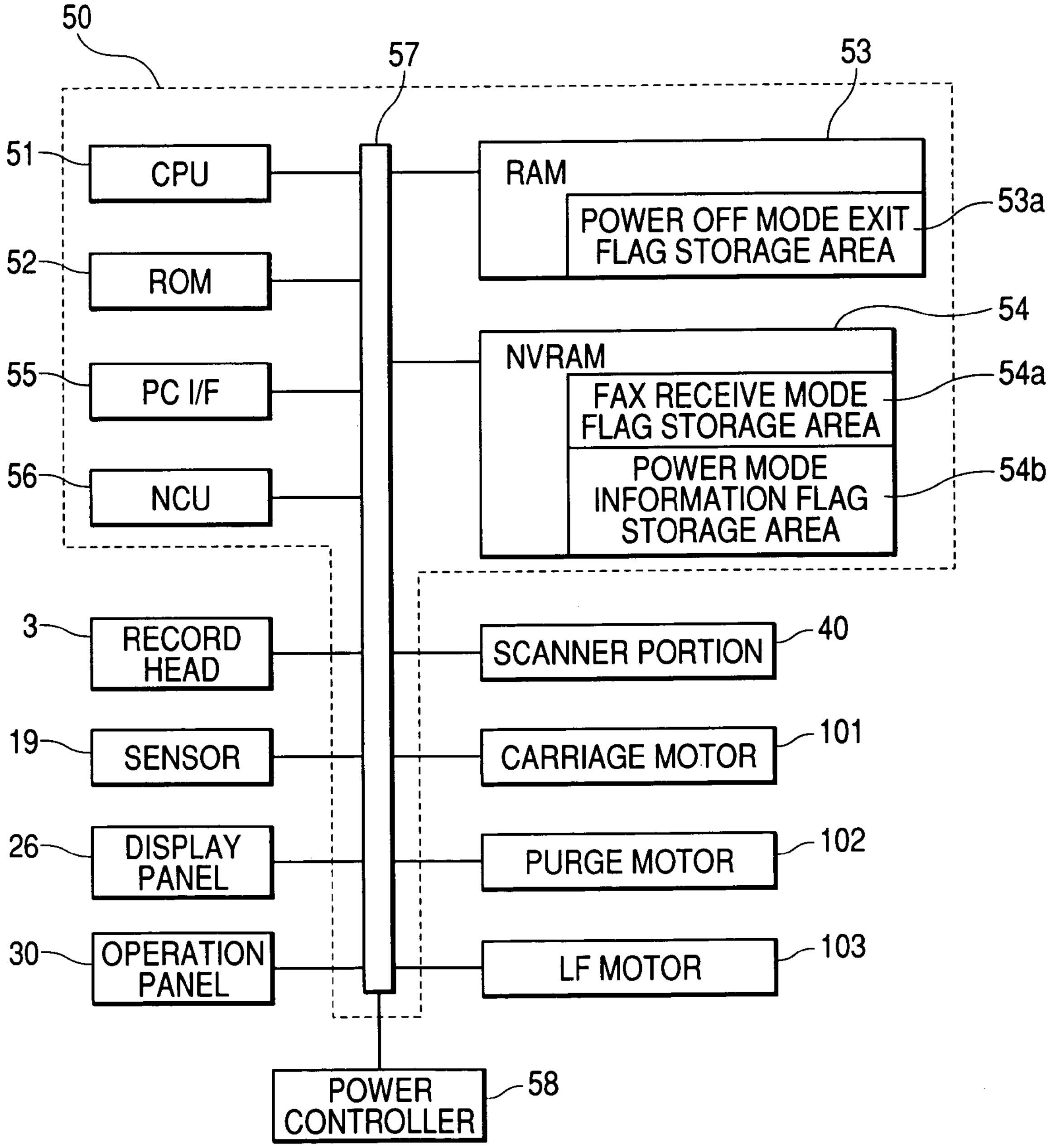
FIG. 3 is a block diagram to show the configuration of a control system of the multifunction processing machine.
Figure 4:
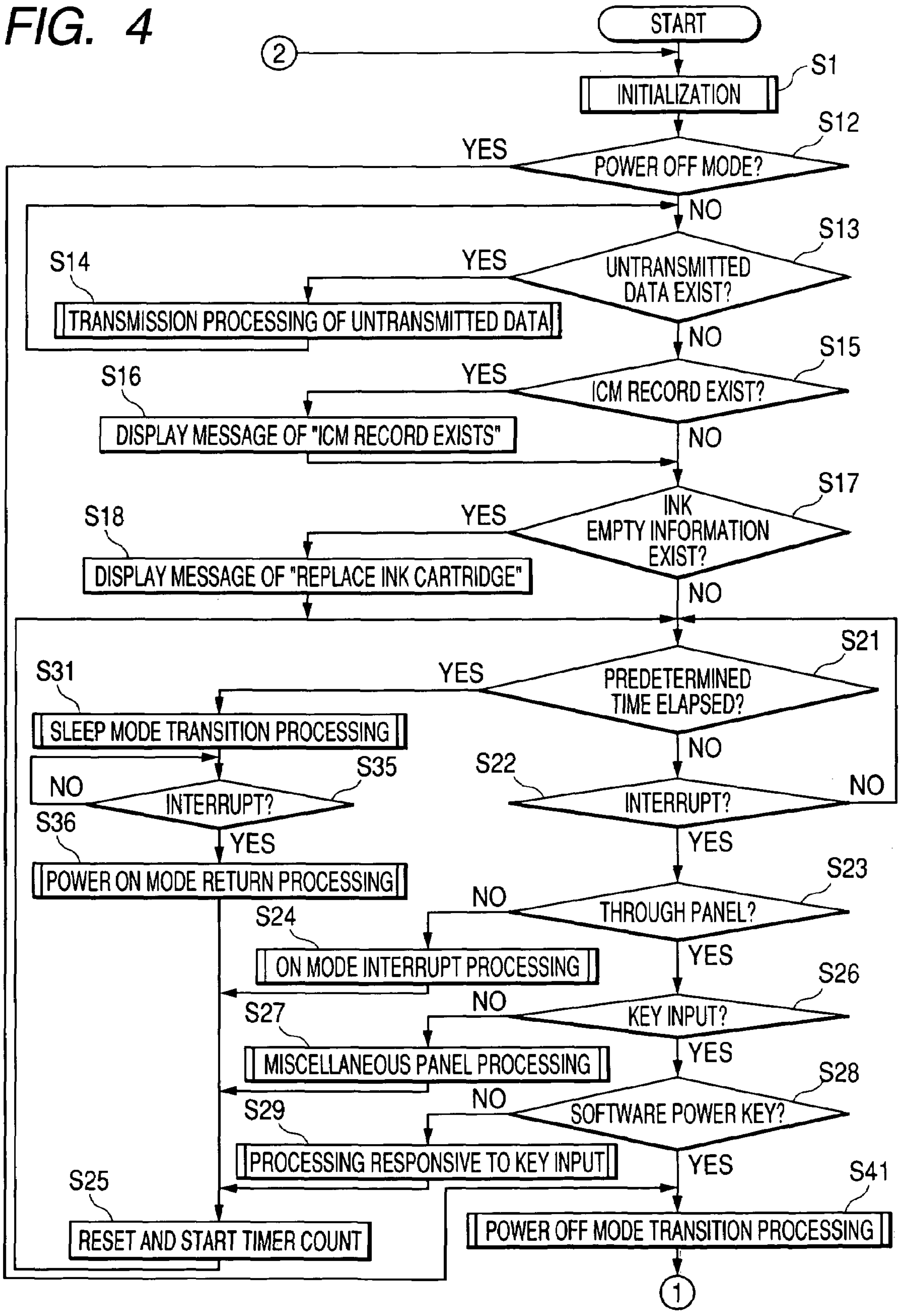
FIG. 4 is a flowchart to show a main routine of processing executed by the control system.
Figure 5:
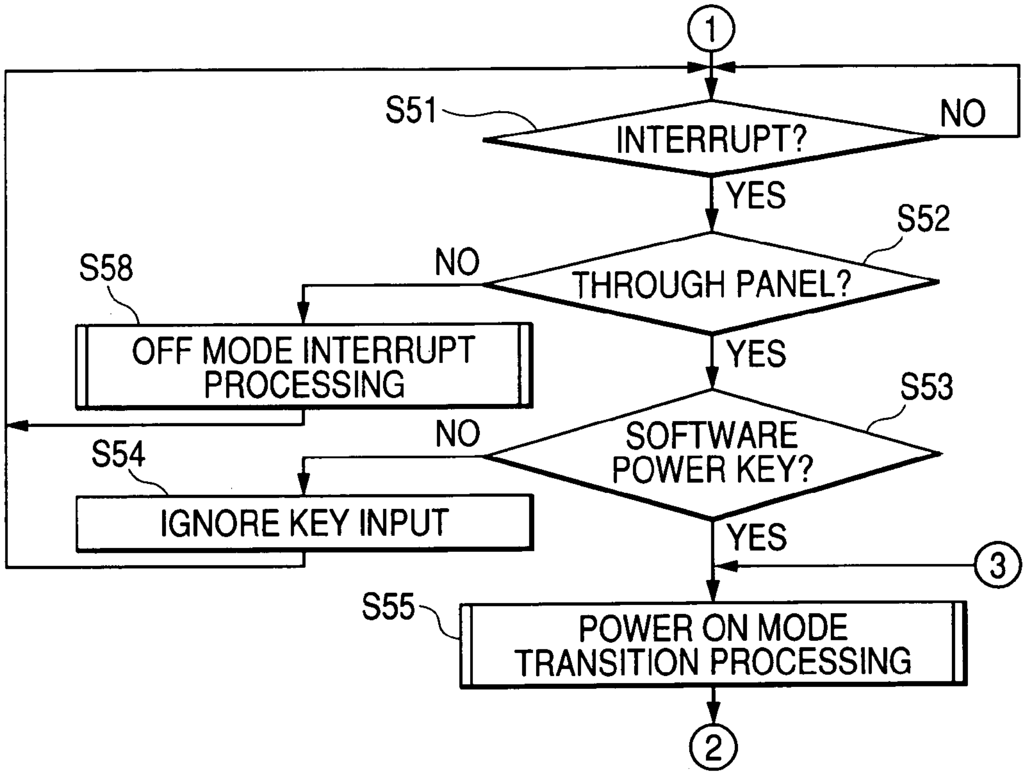
FIG. 5 is a flowchart to show continuation of the main routine.

A power unit connected to the commercial power via a power plug 105 (see FIG. 1) is not shown in FIG. 3; in fact, however, power is supplied from the power unit to the CPU 51, the motors, etc. The power controller 58 controls the supply of power from the power unit based on an instruction from the CPU 51 to switch the multifunction processing machine 100 to the POWER OFF mode or the FAX RECEIVE mode.

Next, processing executed by the control portion 50 will be discussed with flowcharts of FIGS. 4 to 16. In the description of the processing to follow, it is assumed that the POWER OFF mode exit flag, the FAX RECEIVE mode flag, and the power mode information flag (simply power mode information) are read and set in the POWER OFF mode exit flag storage area 53*a*, the FAX RECEIVE mode flag storage area 54*a*, and the power mode information flag storage area 54*b*, and partial description will not be given.

Figure 6:
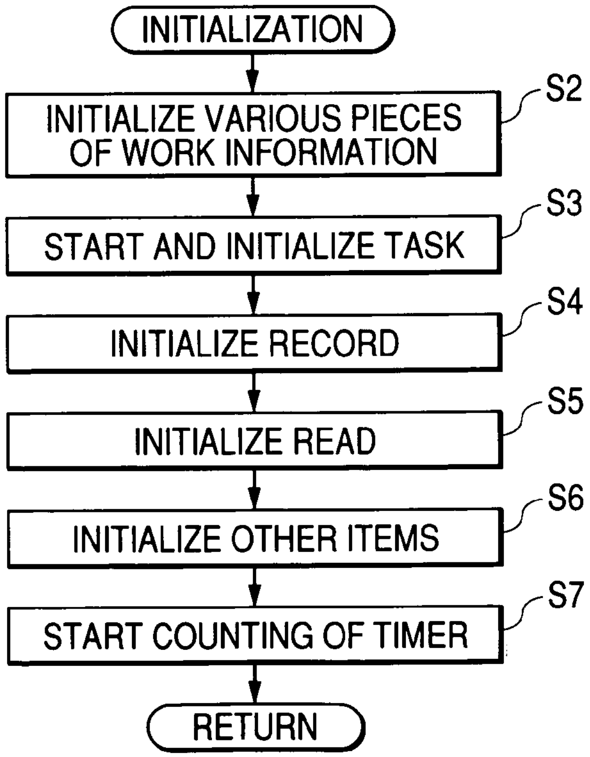
FIG. 6 is a flowchart to show initialization processing in the main routine.

The multifunction processing machine 100 does not include a physical (hardware) switch of the main power on the operation panel 30, a side of a cabinet, etc. Therefore, the power plug 105 of the multifunction processing machine 100 implements the physical (hardware) switch of the main power. When the power plug 105 of the multifunction processing machine 100 is connected to the 100-V commercial power, the control portion 50 starts the processing shown in FIG. 4, As shown in the figure, when starting the processing, the control portion 50 first executes various types of initialization at step 1 (S1). FIG. 6 is a flowchart to show initialization processing at S1. As shown in the figure, in the processing, various pieces of work information are initialized (S2), a task is started and is initialized (S3), a record is initialized (S4), read is initialized (S5), and other items are initialized (S6) and then counting of a timer is started (S7) and the process returns to the main routine (S12 in FIG. 4).

At S12, the power mode information is referenced for determining whether or not the machine is in the power off mode. If the machine is not in the power off mode (N at S12), the process goes to S13 and whether or not untransmitted FAX data (image data) exists is determined. If untransmitted data exists (Y at S13), the process goes to S14 and transmission processing of untransmitted data executed as a different subroutine is started and again the process goes to S13. When S13 and S14 are thus repeated and all untransmitted data is transmitted, the determination made at S13 becomes N and the process goes to S15.

At S15, whether or not ICM record exists is determined. If ICM record exists (Y at S15), a message of "ICM record exists" is displayed on the display panel 26 at S16 to notify the user that ICM record exists, and the process goes to S17. If it is not determined at S15 that ICM record exists (N at S15), S16 is skipped and the process goes directly to S17.

At S17, whether or not ink empty information indicating that ink becomes scanty in any ink cartridge 2 exists is determined. If ink empty information exists (Y at S17), a message of "replace ink cartridge" is displayed on the display panel 26 at S18 and then the process goes to S21; if ink empty information does not exist (N at S17), the process goes directly to S21.

At S21, whether or not a predetermined time has elapsed is determined based on the count of the timer. If the predetermined time has not elapsed (N at 521), the process goes to S22 and whether or not an interrupt occurs is determined. If an interrupt does not occur, again the process goes to S21 and a standby mode is entered until an interrupt occurs or the predetermined time has elapsed in the loop of S21 and S22.

If an interrupt occurs before the predetermined time has elapsed (Y at S22), whether or not the interrupt is caused through the operation panel 30 is determined at S23. If the interrupt is not caused through the operation panel 30 (N at S23), namely, if the interrupt is a signal input from the PC interface portion 55 or a USB (not shown) or the like, ON mode interrupt processing is executed at S24 for performing known interrupt processing responsive to the signal, etc. At S25 following S24, count of the timer is reset and is started and again the process goes to the loop of S21 and S22.

If the interrupt is caused through the operation panel 30 (Y at S23), whether or not the interrupt is key input is determined at S26. If the interrupt is not key input (N at S26), the corresponding miscellaneous panel processing is executed at S27 and then the process goes to the loop of S21 and s22 through S25. If the interrupt is key input (Y at S26), whether or not the key input is key input of the software power key 37 is determined at S28. If the key input is not key input of the software power key 37 (N at S28), processing responsive to the key input is executed at S29 and the process goes to the loop of S21 and S22 through S25. The processing at S29 is, for example, processing of storing the number in the RAM 53 and displaying the number on the display panel 26 when the user enters the number of the FAX destination with the digits buttons 31.

Figure 7:
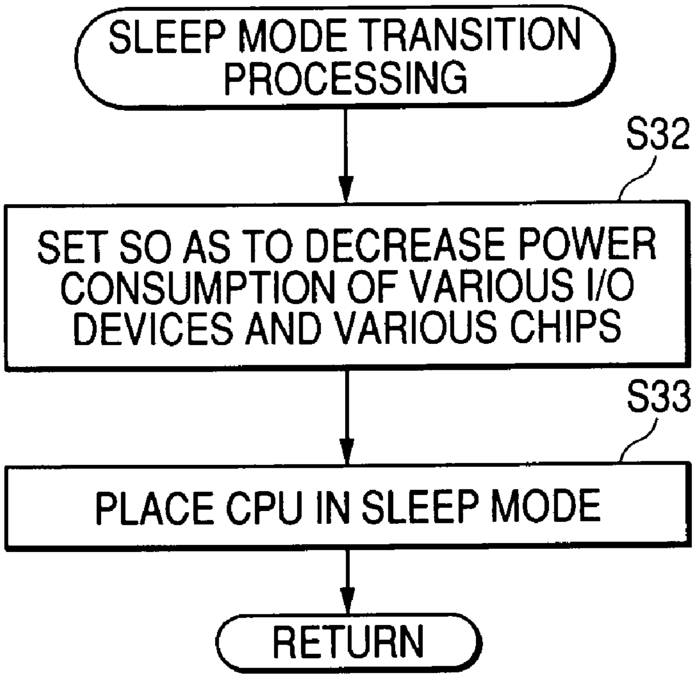
FIG. 7 is a flowchart to show sleep mode transition processing in the main routine.
Figure 8:
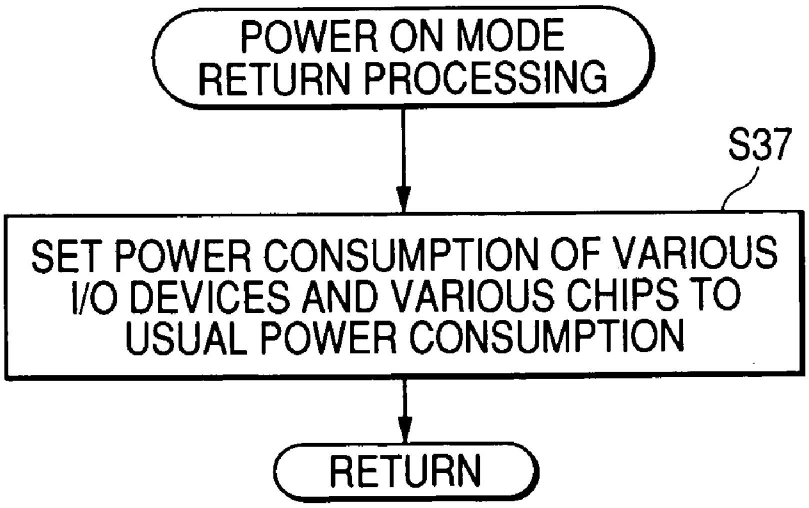
FIG. 8 is a flowchart to show POWER ON mode return processing in the main routine.

On the other hand, if the predetermined time has elapsed in the loop of S21 and S22 (Y at S21), the process goes to S31 and sleep mode transition processing is executed. The sleep mode transition processing is processing of setting the machine so as to decrease power consumption of various I/O devices and various chips (S32) and placing the CPU 51 in sleep mode (S33), as shown in FIG. 7. After the sleep mode transition processing (S31) is exited, the machine (control portion 50) stands by at S35 until an interrupt occurs. During the standby mode at S35 (namely, in the sleep mode), the display panel 26 continues to display SLEEP and an LED holds the state when a transition is made to the sleep mode, namely, one state of on state, blink state, and off state.

When an interrupt occurs during the standby mode at S35 (Y at S35), POWER on mode return processing at S36 is executed and then the process goes to the loop of S21 and S22 through S25. The POWER ON mode return processing is processing of setting power consumption of various I/O devices and various chips to usual power consumption (S37).

Figure 9:
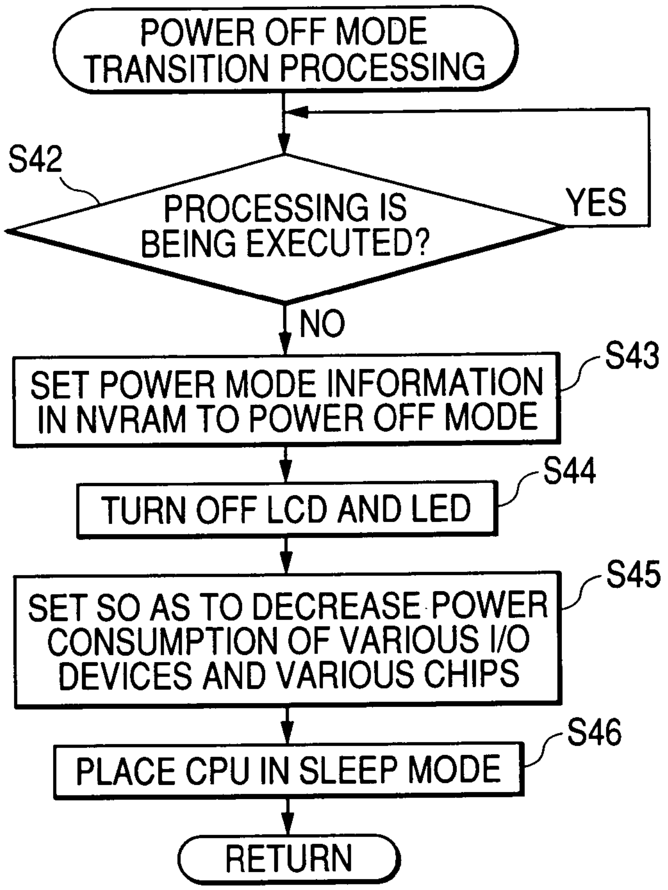
FIG. 9 is a flowchart to show POWER OFF mode transition processing in the main routine.

If the user presses the software power key 37 during the loop of S21 and S22, the process goes to S41 as the determinations made at S22, S23, S26, and S28 are Y. At S41, POWER OFF mode transition processing shown in FIG. 9 is executed.

In the POWER OFF mode transition processing, first at S42, whether or not processing is being executed in a different routine is determined. If processing is being executed in a different routine (Y at S42), the control portion 50 stands by. If the processing being executed does not exist (N at S42), the process goes to S43 and the power mode information in the NVRAM 54 is set to the POWER OFF mode. Subsequently, the LCD and the LED (corresponding to display portion) of the display panel 26, etc., are turned off (S44), setting is made so as to decrease power consumption of various I/O devices and various chips (S45), the CPU 51 is placed in the sleep mode (S46), and the process goes to S51 shown in FIG. 5.

At S51, the control portion 50 stands by until an interrupt occurs. When an interrupt occurs (Y at S51), the process goes to S52. At S52, whether or not the interrupt is input through the operation panel 30 is determined. If not the interrupt is input through the operation panel 30 (Y at 552), whether or not the interrupt is caused by the software power key 37 is determined at S53. If the interrupt is not caused by the software power key 37 (N at S53), the key input is ignored (S54) and again the process goes to S51.

Figure 10:
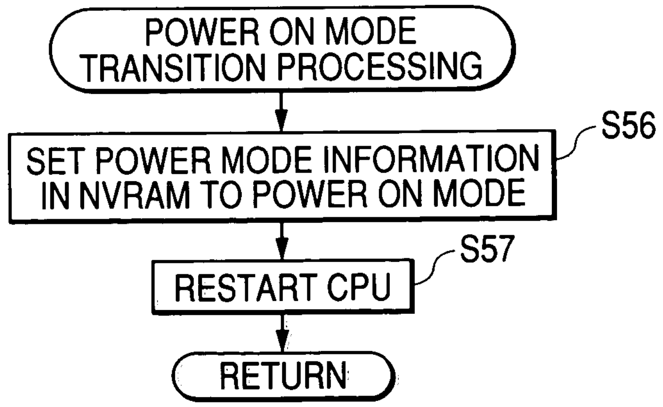
FIG. 10 is a flowchart to show POWER ON mode transition processing in the main routine.

On the other hand, if the interrupt is caused by the software power key 37 (Y at S53), the process goes to S55 and POWER ON mode transition processing is executed and then the process returns to the main routine (S1 in FIG. 4) and the processing is restarted. The POWER ON mode transition processing at S55 is processing of setting the power mode information in the NVRAM 54 to the POWER ON mode (S56) and restarting the CPU 51 (S57) as shown in FIG. 10.

Figure 11:
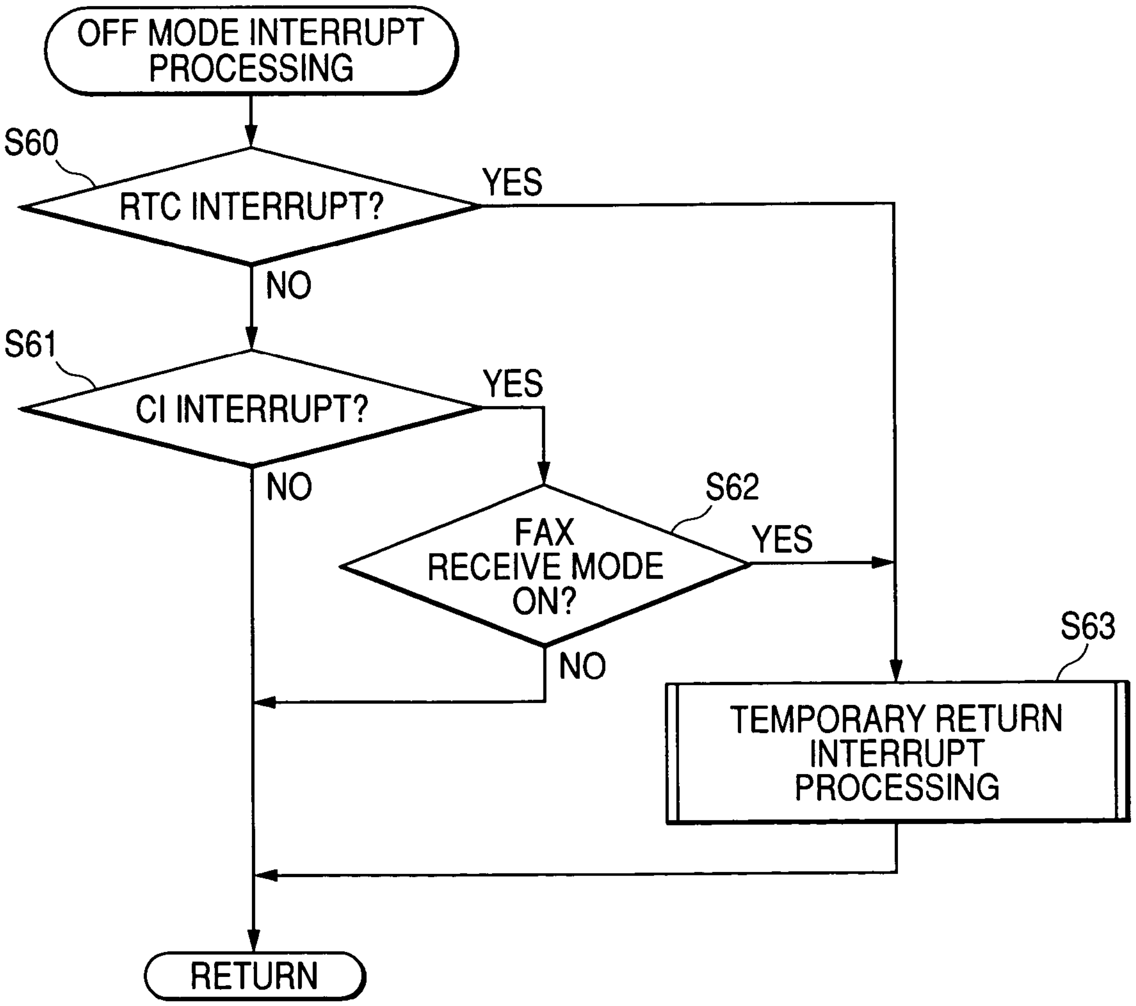
FIG. 11 is a flowchart to show OFF mode interrupt processing in the main routine.

If an interrupt occurs rather than through the panel during the standby mode at S51, namely, during the standby mode in the POWER OFF mode (Y at S51 and N at S52), the process goes to S58 and OFF mode interrupt processing is executed. FIG. 11 shows details of the OFF mode interrupt processing. In the OFF mode interrupt processing, whether or not the interrupt is an interrupt caused by the RTC (real time clock) is checked (S60) and whether or not the interrupt is an interrupt caused by CI is checked (S61). If the interrupt is caused by any other factor (N at S60 and N at S61), the process returns to S51 in FIG. 51. If the interrupt is caused by the CI (Y at S61), whether or not the FAX RECEIVE mode is set to ON is determined based on the FAX RECEIVE mode flag at S62. If the FAX RECEIVE mode is OFF (N at S62), the process returns to S51 in FIG. 51.

That is, in the OFF mode interrupt processing, any other interrupt than the RTC or IC interrupt is ignored (N at S61) and if the FAX RECEIVE mode is OFF (N at S62) although the interrupt is caused by the CI, the interrupt is ignored.

Figure 12:
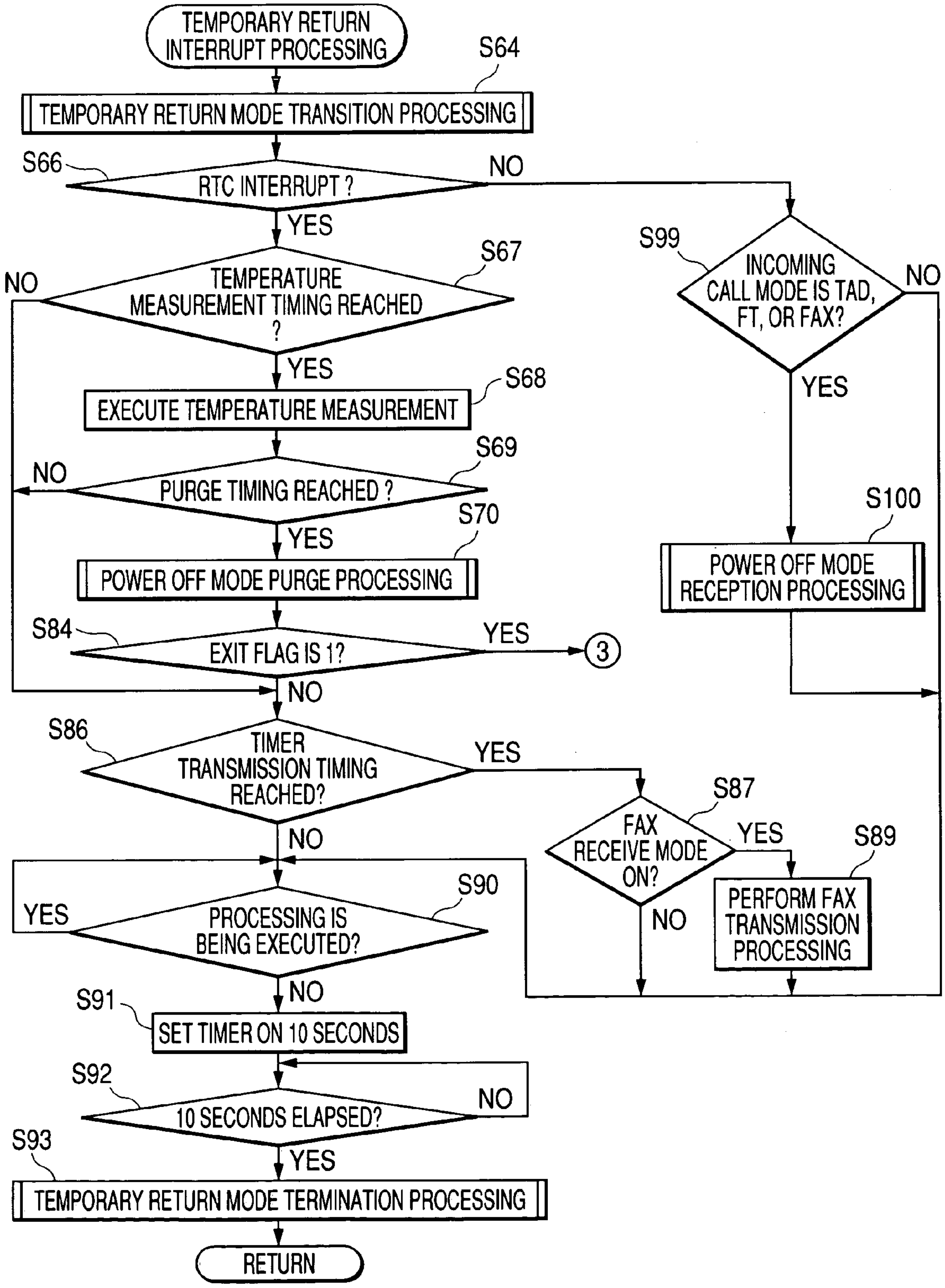
FIG. 12 is a flowchart to show temporary return interrupt processing in the OFF mode interrupt processing.

If the interrupt is caused by the RTC (Y at S60) or if the interrupt is caused by the CI (Y at S61) and the FAX RECEIVE mode is ON (Y at S62), the process goes to S63 and temporary return interrupt processing is executed. FIG. 12 is a flowchart to show the temporary return interrupt processing.

Figure 13:
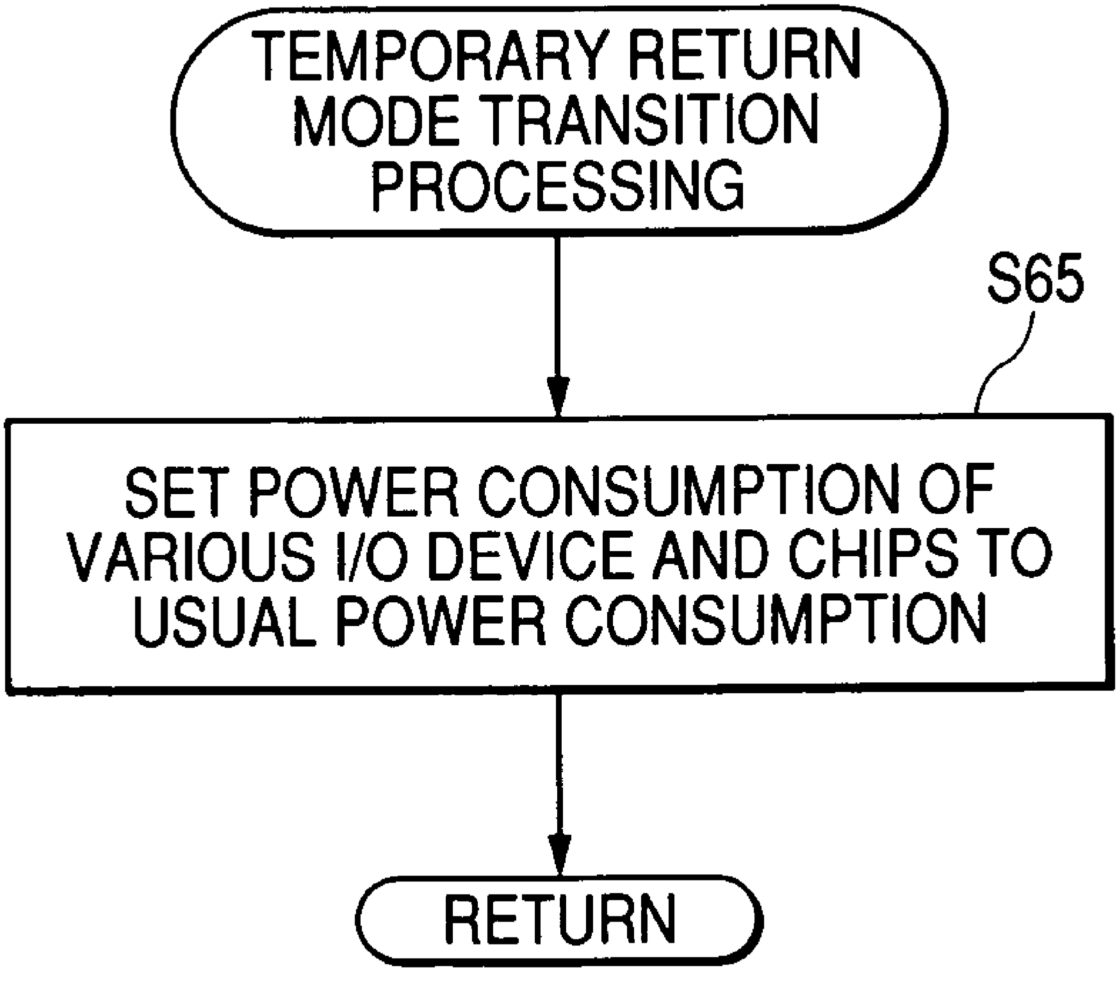
FIG. 13 is a flowchart to show temporary return mode transition processing in the temporary return interrupt processing.

As shown in FIG. 12, in the temporary return interrupt processing, first at S64, temporary return mode transition processing is executed. The temporary return mode transition processing is processing of setting power consumption of various I/O devices and various chips to usual power consumption (S65) as shown in FIG. 13. Subsequently, the process returns to the routine in FIG. 12 (S66) and whether or not the interrupt is an RTC interrupt is determined. If the interrupt is an RTC interrupt (Y at S66), the process goes to S67 and whether or not the temperature measurement timing is reached is determined. If the temperature measurement timing is reached (Y at S67), temperature measurement is executed at S68 and whether or not the purge timing is also reached is determined at S69. If the purge timing is also reached (Y at S69), the process goes to S70 and POWER OFF mode purge processing is executed.

Figure 14:
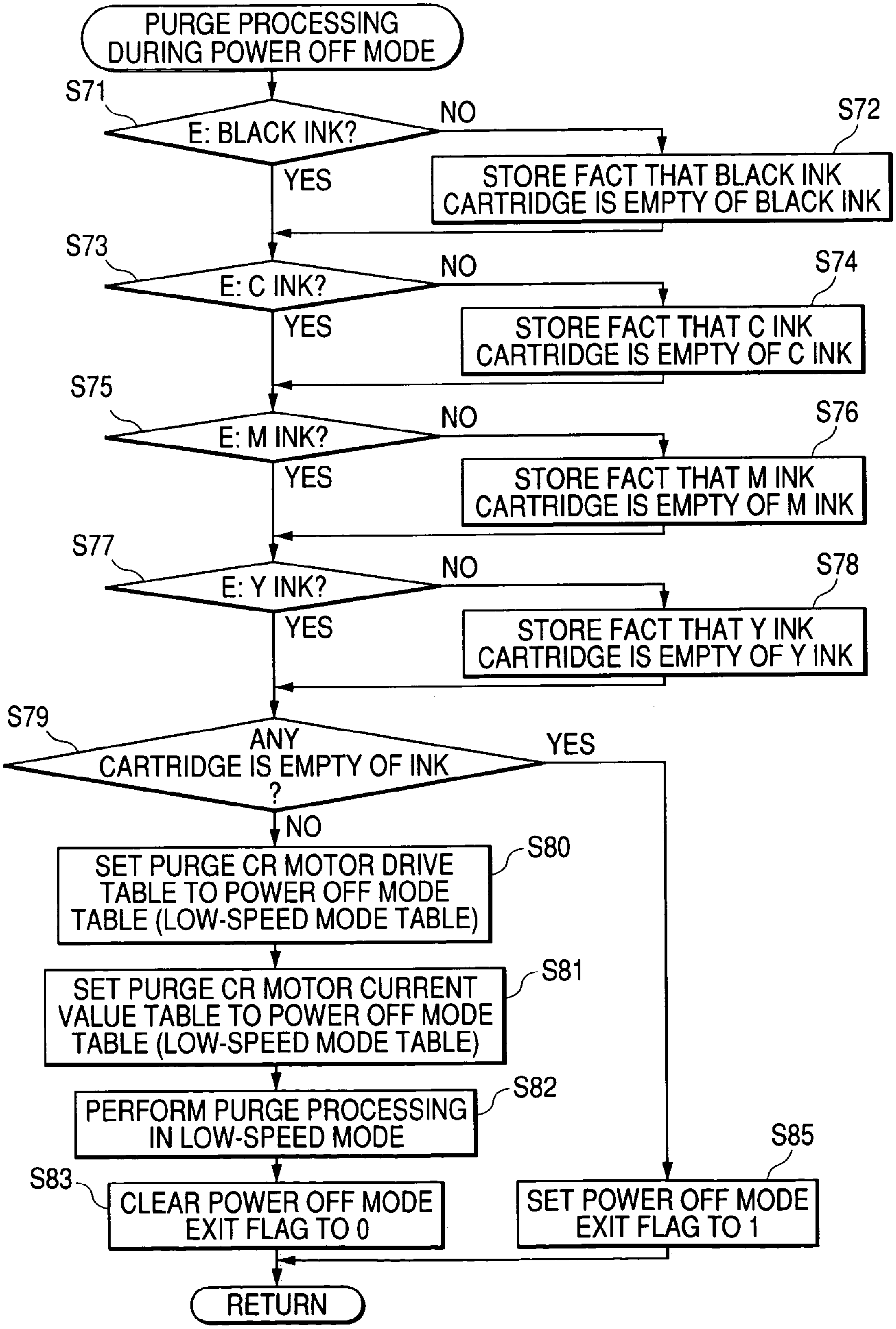
FIG. 14 is a flowchart to show POWER OFF mode purge processing in the temporary return interrupt processing.

FIG. 14 is a flowchart to show the POWER OFF mode purge processing. In the processing, first at S71, the value of the ink remaining amount dot counter concerning black ink in greater than a preset purge dot count (E: Black ink) is determined. The ink remaining amount dot counter is a counter set to a predetermined value responsive to the size of the ink cartridge 2 when the corresponding color ink cartridge 2 is replaced with a new one and decremented by one each time one-dot ink is ejected. That is, at S71, whether or not the amount of black ink stored in the black ink cartridge 2 (corresponding to the value of the ink remaining amount dot counter) is as much as the amount required for executing purge processing (corresponding to the purge dot count) is determined. If the value of the ink remaining amount dot counter is equal to or less than the purge dot count (N at S71), the fact that the black ink cartridge is empty of black ink is stored in the RAM 53 at S72 and then the process goes to S73. If the value of the ink remaining amount dot counter is greater than the purge dot count (Y at S71), the process goes directly to S73.

At S73, whether or not the value of the ink remaining amount dot counter concerning cyan ink (C ink) is larger than a preset purge dot count is determined. If the value of the ink remaining amount dot counter is equal to or less than the purge dot count (N at S73), the fact that the cyan ink cartridge is empty of cyan ink is stored in the RAM 53 at S74 and then the process goes to S75. If the value of the ink remaining amount dot counter is greater than the purge dot count (Y at S73), the process goes directly to s75.

Likewise, at S75, whether or not the value of the ink remaining amount dot counter concerning magenta ink (M ink) is larger than a preset purge dot count is determined. If the value of the ink remaining amount dot counter is equal to or less than the purge dot count (N at S75), the fact that the magenta ink cartridge is empty of magenta ink is stored in the RAM 53 at 576 and then the process goes to S77. If the value of the ink remaining amount dot counter is greater than the purge dot count (Y at S75), the process goes directly to S77.

At S77, whether or not the value of the ink remaining amount dot counter concerning yellow ink (Y ink) is larger than a preset purge dot count is determined. If the value of the ink remaining amount dot counter is equal to or less than the purge dot count (N at S77), the fact that the yellow ink cartridge is empty of yellow ink is stored in the RAM 53 at S78 and then the process goes to S79. If the value of the ink remaining amount dot counter is greater than the purge dot count (Y at S77), the process goes directly to S79.

At S79, whether or not any ink cartridge 2 is determined to be empty of ink at S71 to S78 is determined if none of the ink cartridges 2 is determined to be empty of ink (N at S79), the process goes to S80. At S80, a purge carriage motor (CR motor) drive table is set to a POWER OFF mode table, namely, a low-speed mode table. At S81, a purge carriage motor current value table is set to a POWER OFF mode table, namely, a low-speed mode table.

At S82, low-speed mode purge processing is executed; In the purge processing, not only the carriage motor 101, but also the purge motor 102 is driven at low speed according to the settings at S80 and S81, and defective ink in the record head 3 is slowly sucked by the suction pump 15. At S83, the POWER OFF mode exit flag is cleared to "0" and the process returns to the routine in FIG. 12 (S84) on the other hand, if any ink cartridge 2 is determined to be empty of ink at S71 to S78 (Y at S79), the POWER OFF mode exit flag is set to "1" at S85 and the process returns to the routine in FIG. 12 (S84).

At S84, whether or not the POWER OFF mode exit flag is "1" is determined. If the POWER OFF mode exit flag is "1" (Y at S84), the process goes to S55 in FIG. 5 and POWER on mode transition processing is executed. Then, the process returns to the main routine in FIG. 4 and processing is restarted at S1. Thus, if it becomes difficult to execute the maintenance operation because any ink cartridge becomes empty of ink, the multifunction processing machine 100 is restored to the POWER ON mode and necessary processing such as display based on the processing at S18 can be executed.

Referring again to FIG. 12, if the POWER OFF mode exit flag is "0" (N at 584), the process goes to S86. When it is determined at S67 that the temperature measurement timing is not reached (N) or when it is determined at S69 that the purge timing is not reached (N), the subsequent steps are skipped and the process goes directly to S86.

At S86, whether or not the timer transmission timing is reached is determined. If the timer transmission timing is reached (Y at S86), the process goes to S87 and whether or not the FAX RECEIVE mode is ON is determined. If the FAX RECEIVE mode is ON (Y at S87), FAX transmission processing of a different routine is started at S89 and then the process goes to S90. If the FAX RECEIVE mode is OFF (N at S87), the process goes directly to S90. If it is not determined at S86 the timer transmission timing is reached (N), the process goes directly to S90 from S86.

Figure 15:
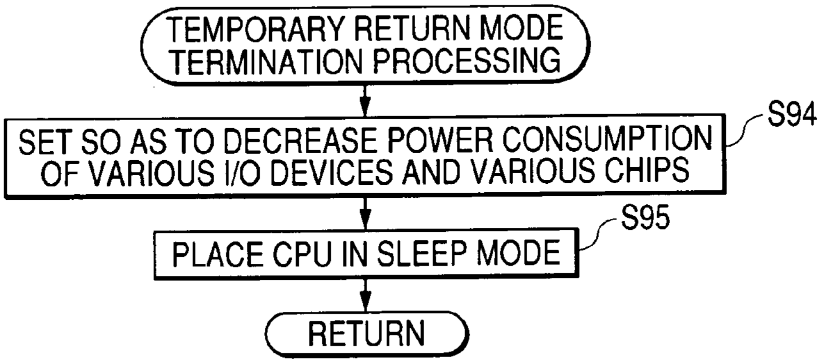
FIG. 15 is a flowchart to show temporary return mode termination processing in the temporary return interrupt processing.

At S90, whether or not processing is being executed in a different routine is determined. If processing is being executed in a different routine (Y at S90), the control portion 50 stands by if the processing being executed does not exist (N at S90), a 10-second timer is set at S91 and the control portion 50 stands by at S92 until expiration of 10 seconds. Upon expiration of 10 seconds, temporary return mode termination processing at S93 is executed and then the process returns to S51 in FIG. 5. The temporary return mode termination processing is processing of setting the machine so as to decrease power consumption of various I/o devices and various chips (S94) and placing the CPU 51 in sleep mode (S95), as shown in FIG. 15. FAX data inhibited from being FAX-transmitted (S89) as the determination made at S87 is N is transmitted when the software power key 37 is pressed (Y at S53) and the process goes to S14 in FIG. 4 through S55, S1, S12, and S13.

On the other hand, if the interrupt is not an RTC interrupt (N at S66), namely, if the interrupt is a CI interrupt (see FIG. 11), the process goes to S99 and whether or not the incoming call mode is any mode of TAD (telephone answering device), FT, or FAX is determined. If the incoming call mode is not any mode (N at S99), the process goes to S90. If the incoming call mode is any mode (Y at S99), POWER OFF mode reception processing is executed at S100 and then the process goes to S90.

Figure 16:
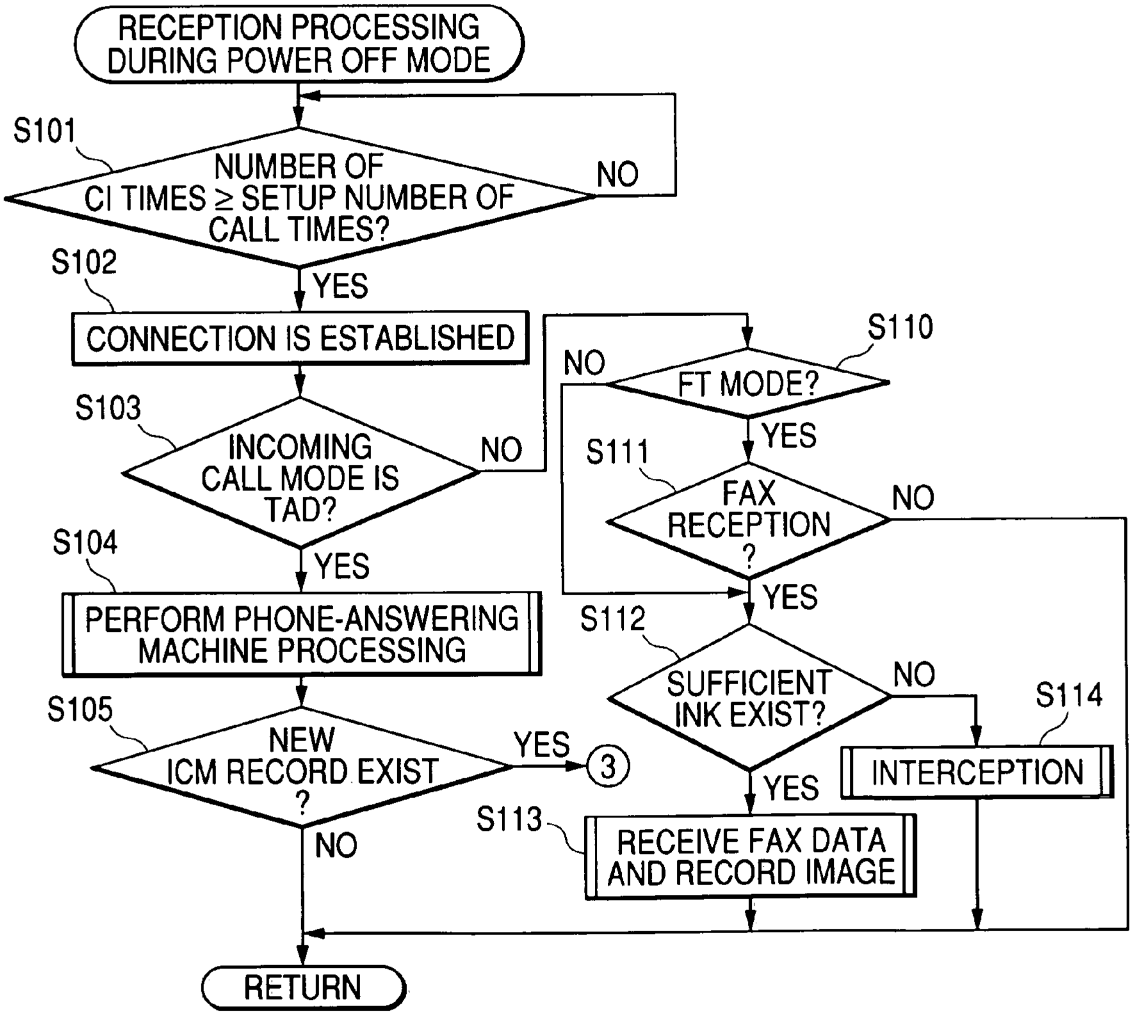
FIG. 16 is a flowchart to show POWER OFF mode reception processing in the temporary return interrupt processing.

FIG. 16 is a flowchart to show the POWER OFF mode reception processing. As shown in FIG. 16, in the processing, first at S101, the control portion 50 stands by until the number of times a CI has been received reaches the setup number of call times. If the number of times a CI has been received reaches the setup number of call times (Y at S101), the connection is established at S102 and whether or not the incoming call mode is the TAD mode is determined at S103.

If the incoming call mode is the TAD mode (Y at S103), known phone-answering machine processing is executed at S104 and whether or not new ICM record exists is determined at S105. If new ICM record does not exist (N at S105), the process returns to S90 in FIG. 12; if new ICM record exists (Y at S105), the process returns to the routine in FIG. 5 (S55) and POWER ON mode transition processing is executed. Then, the process returns to the main routine in FIG. 4 and processing is restarted at S1. Thus, if new ICM record exists, the multifunction processing machine 100 is restored to the POWER ON mode and necessary processing such as display based on the processing at S16 can be executed.

On the other hand, if the incoming call mode is not the TAD mode (N at S103), the process goes to S110 and whether or not the incoming call mode is the FT mode is determined. If the incoming call mode is the FT mode (Y at S110), the process goes to S111 and whether or not the received data is FAX data (FAX reception is applied) is determined. If the received data is not FAX data (N at S111), the process returns to S90 in FIG. 12.

On the other hand, if it is determined at S111 that the received data is FAX data (Y) or if it is determined at S110 that the incoming call mode is not the FT mode (N) (namely, is the FAX mode), the process goes to S112 and whether or not sufficient ink exists is determined based on the value of the ink remaining amount dot counter. If sufficient ink exists (Y at S112), the FAX data is received and the image corresponding to the FAX data is recorded on record paper P at S113 and the process returns to S90 in FIG. 12. On the other hand, if sufficient ink does not exist (N at S112), interception is executed at S114 and the process returns to S90 in FIG. 12.

Figure 17:
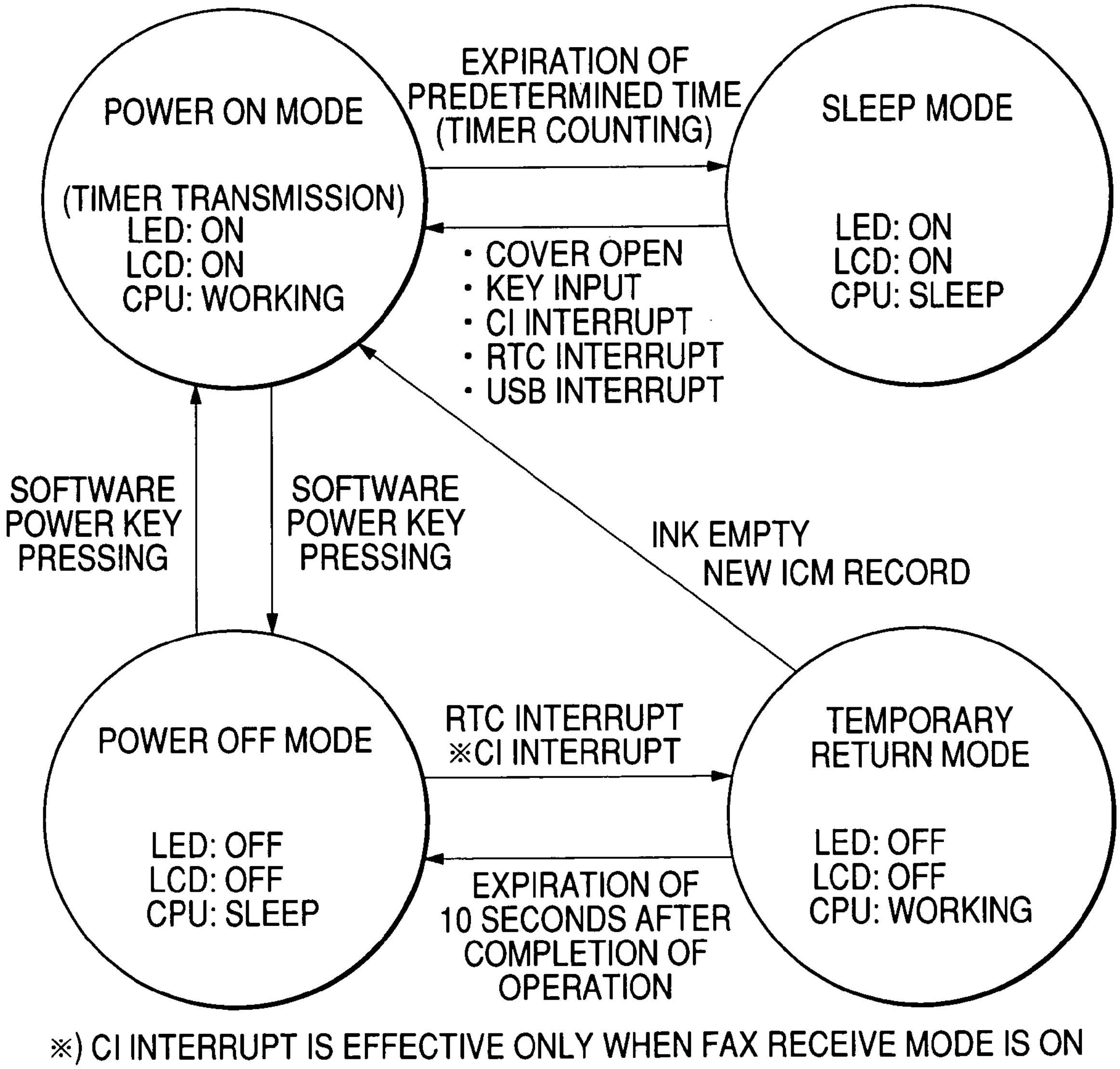
FIG. 17 is a state transition diagram to show the mode switch state transitions in the processing.

FIG. 17 is a state transition diagram to provide a summary of the mode switch state transitions according to the processing described above. As shown in FIG. 17, the multifunction processing machine 100 includes the POWER ON mode (S1 to S36) wherein the LED and the LCD are on and the CPU 51 is working and can execute various types of operation and the POWER OFF mode (S51 to S58) wherein the LED and the LCD are off and the CPU 51 sleeps, and the multifunction processing machine 100 is switched between both the modes as the user presses the software power key 37 (S28, S53). If it is detected by timer counting that the predetermined time has elapsed with no interrupt during the POWER ON mode (Y at S21), a transition is made to the sleep mode. In the sleep mode, the LCD is on, the LED holds the state of on, off, blinking, etc., and the CPU 51 sleeps. If any interrupt such as cover open, key input, CI interrupt, RTC interrupt, or USB interrupt occurs (Y at S35), a transition is made from the sleep mode to the POWER ON mode.

On the other hand, in the POWER OFF mode, most interrupts such as cover open, PC print instruction, and USB interrupt are ignored, but if an RTC interrupt occurs (Y at S60) or if a CI interrupt occurs when the FAX RECEIVE mode is ON (Y at S62), a transition is made to the temporary return mode (S66 to S92). In the temporary return mode, the LED and the LCD are off, but the CPU 51 is working and purge processing, FAX reception, and ICM reception in the low-speed mode are executed and further when the FAX RECEIVE mode is ON, timer transmission is also executed. Upon expiration of 10 seconds after the operation terminates (Y at S92), a transition is again made to the POWER OFF mode from the temporary return mode. If ink empty is detected during the temporary return mode (Y at S79) or if new ICM record exists (Y at S105), a transition is made from the temporary return mode directly to the POWER ON mode.

As described above, the multifunction processing machine 100 of the embodiment is switched between the mode in which only the maintenance operation (S68, S70) is permitted during the POWER OFF mode and the mode in which timer transmission (S89) and reception processing responsive to a CI interrupt (S100) are permitted in addition to the maintenance operation depending on whether the FAX RECEIVE mode is set to OFF or ON. Timer transmission and reception processing responsive to a CI interrupt have high possibility of producing noise, but there is also demand for executing processing without delay. Therefore, the multifunction processing machine 100 designed for being switchable between the mode in which the processing is permitted during the POWER OFF mode and the mode in which the processing is not permitted can meet the user's demands extremely well. Moreover, the interrupt processing is executed as a transition is made to the temporary return mode, and after the interrupt processing terminates, a transition is again made to the POWER OFF mode and the LED and the LCD are also turned off except in the following cases and thus the power consumption can be decreased extremely well:

When new ICM record exists during the POWER OFF mode (Y at S105) or if ink empty is detected at the maintenance operation time (Y at S84), the multifunction processing machine 100 makes a transition to the POWER ON mode. Thus, the user can be notified of the fact at S16 and S18 and the user's convenience is still more enhanced. Moreover, if ink empty is detected, the maintenance operation is not executed, so that the record head 3 can be well protected.

In the multifunction processing machine 100, if timer transmission during the POWER OFF mode is inhibited, when a transition is made to the POWER ON mode as the software power key 37 is pressed or the above-mentioned detection is made, the FAX data to be FAX-transmitted is transmitted (S14). Thus, the FAX data to be transmitted essentially at the setup time can be transmitted as early as possible.

Even if the FAX RECEIVE mode is OFF during the POWER OFF mode, timer transmission may be enabled, in which case when the determination made at S86 is Y, the process may go directly to S89. An additional flag other than the FAX RECEIVE mode flag may be provided and the flag may be referenced at S87 instead of the FAX RECEIVE mode flag. In this case, the user can specify whether or not timer transmission is to be inhibited as desired when the FAX RECEIVE mode is OFF during the POWER OFF mode.

The invention is not limited to the specific embodiment thereof and can be embodied in various forms without departing from the spirit and scope of the invention. For example, in the embodiment, RTC and CI interrupts are permitted during the POWER OFF mode as the power saving mode, and the CI interrupt is permitted only when the FAX RECEIVE mode is ON (see FIG. 11); in addition, an interrupt of cover open, etc., may be permitted. In this case, considering the user's convenience to sleep quietly, it is desirable that the interrupt of cover open, like the CI interrupt, should be permitted only when the FAX RECEIVE mode is ON.

Further, the RTC interrupt is generated as a similar interrupt signal regardless of the purge timing or the timer transmission timing. Thus, in the embodiment, all RTC interrupts are grasped in a wide sense as interrupts for executing the maintenance operation and when the RTC interrupt occurs (Y at S60), a transition is made to the temporary return mode regardless of whether or not the FAX RECEIVE mode is ON. In contrast, if the FX RECEIVE mode is OFF, a transition may be made to the temporary return mode only when an RTC interrupt occurs and the timing is the purge timing.

Figure 18:
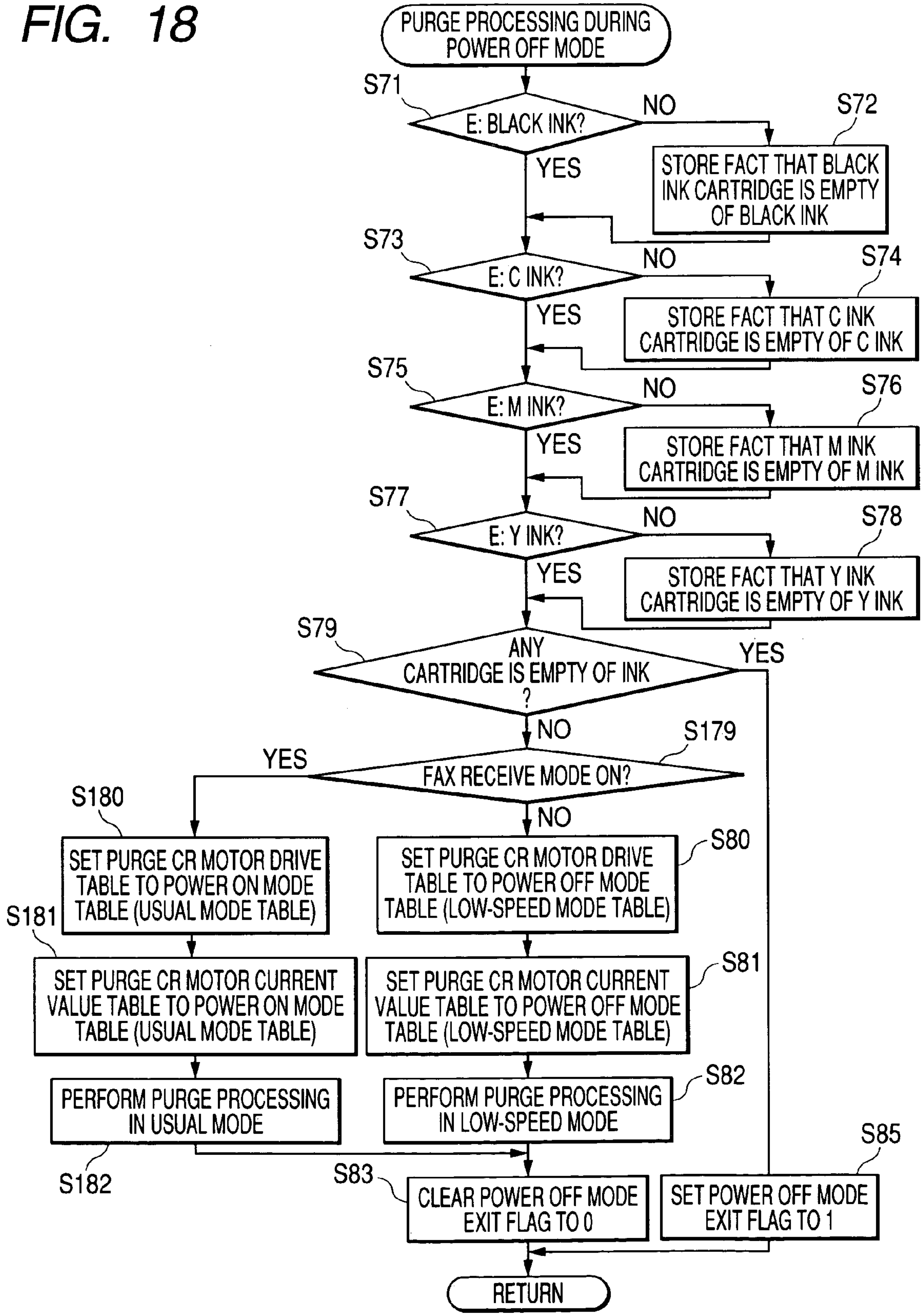
FIG. 18 is a flowchart to show a modification of the POWER OFF mode purge processing.

Further, in the embodiment, purge is executed in the low speed mode during the POWER OFF mode (S80 to S82), so that noise reduction during the POWER OFF mode can be still more enhanced; purge processing may be switched between low speed mode and usual speed mode in response to whether or not the FAX RECEIVE mode is ON. FIG. 18 is a flowchart to show processing for switching the POWER OFF mode purge processing between low speed mode and usual speed mode in response to whether or not the FAX RECEIVE mode is ON. Steps similar to those previously described with reference to the flowchart of FIG. 14 are denoted by the same step numbers in FIG. 18 and will not be discussed again in detail.

As shown in FIG. 18, in the embodiment, if it is determined at S79 that none of the ink cartridges 2 is empty of ink (N), the process goes to S179 and whether or not the FAX RECEIVE mode is ON is determined. If the FAX RECEIVE mode is OFF (N at S179), purge processing is executed at low speed at S80 to S82 as in the embodiment described above, and the process goes to S83.

On the other hand, if the FAX RECEIVE mode is ON (Y at S179), purge processing is executed as usual at S180 to S182 described below and the process goes to S83: At S180, the purge carriage motor drive table is set to a POWER ON mode table (usual mode table). At S181, the purge carriage motor current value table is set to a POWER ON mode table (usual mode table). At S182, the purge processing is executed in the usual mode (the speed of the purge motor 102 is also usual). Consequently, if the FAX RECEIVE mode is ON, ink in the record head 3 can be sucked vigorously as usual. In addition, various forms are possible as the switching operation between permission and inhibition in response to whether the FAX RECEIVE mode is ON or OFF.

In the embodiment described above, the POWER ON mode may correspond to usual power mode; the POWER OFF mode may correspond to power saving mode; the state in which the FX RECEIVE mode is ON may correspond to permission mode; the state in which the FAX RECEIVE mode is OFF may correspond to inhibition mode; S80 to S82 may correspond to second maintenance mode; and S180 to S182 may correspond to first maintenance mode. The power controller 58 functions as a first mode setting portion. The CPU 51 functions as a second mode setting portion. S104 may correspond to storage portion; S64, S84, S93, and S105 may correspond to mode transition control portion; S60 and S61 may correspond to interrupt recognition portion; and S14 and S89 may correspond to transmission portion.

The ink jet record apparatus has a connection portion that enables to connect to a communication line; and a reception portion that receives a signal via the communication line connected to the connection portion, wherein the predetermined operation involves reception of image data by the reception portion.

When the reception portion receives image data via the communication line connected to the connection portion, the record head can form an image on a record medium based on the image data. The predetermined operation involves reception of the image data by the reception portion.

The predetermined operation involves reception of the image data by the reception portion. To receive image data and form an image corresponding to the image data, comparatively large noise occurs. The user may want to receive such image data without delay even during the power saving mode. Such operation is involved as the predetermined operation, so that the advantage that the user can specify whether or not the predetermined operation is permitted as he or she desires becomes still more noticeable.

The ink jet record apparatus has: a storage portion that stores a sound signal received by the reception portion, wherein the predetermined operation involves storage of the sound signal by the storage portion.

The predetermined operation involves the operation for the storage portion to store the sound signal received by the reception portion.

The predetermined operation involves the operation for the storage portion to store the sound signal received by the reception portion. The user may want to permit or inhibit storage of such a sound signal during the power saving mode according to user's preference. Therefore, the advantage that the user can specify whether or not the predetermined operation is permitted as he or she desires becomes still more noticeable. The ink jet record apparatus has: a interrupt recognition portion that recognizes a first interrupt to execute the maintenance operation and a second interrupt to execute the predetermined operation, wherein the first mode setting portion that enables to switch between the power saving mode and a temporary return mode in which the maintenance operation and the predetermined operation can be executed, the temporary return mode being different from the usual power mode, during the permission mode, the first mode setting portion switches from the power saving mode to the temporary return mode only if the interrupt recognition portion recognizes the first interrupt or the second interrupt, and during the inhibition mode, the first mode setting portion switches from the power saving mode to the temporary return mode only if the interrupt recognition portion recognizes the first interrupt.

The interrupt recognition portion recognizes the first interrupt and the second interrupt. During the permission mode, the first mode setting portion switches from the power saving mode to the temporary return mode only if the interrupt recognition portion recognizes the first interrupt or the second interrupt. Then, it is made possible to execute the maintenance operation or the predetermined operation in the temporary return mode. On the other hand, during the inhibition mode, the first mode setting portion switches from the power saving mode to the temporary return mode only if the interrupt recognition portion recognizes the first interrupt. Then, it is made possible to execute the maintenance operation in the temporary return mode.

Thus, the maintenance operation and the predetermined operation in the power saving mode and the permission mode or the maintenance operation in the power saving mode and the inhibition mode is executed in the temporary return mode different from the usual power mode. Whether or not the predetermined operation is permitted is determined depending on whether or not a mode is switched to the temporary return mode if the interrupt recognition portion recognizes the second interrupt.

The maintenance operation and the predetermined operation in the power saving mode and the permission mode or the maintenance operation in the power saving mode and the inhibition mode is executed as switching to the temporary return mode different from the usual power mode. Thus, the advantage that different control from the usual power mode can be easily provided in such a manner that the ink jet record apparatus is returned to the power saving mode after the termination of the operation according to the temporary return mode is produced. Whether or not the predetermined operation is permitted is determined depending on whether or not the ink jet record apparatus switches to the temporary return mode if the interrupt to execute the predetermined operation is recognized. Thus, inhibition or permission of the predetermined operation can be set still more reliably.

The first mode setting portion switches from the temporary return mode to the power saving mode when the operation corresponding to the interrupt in the temporary return mode completes.

The first mode setting portion switches from the temporary return mode to the power saving mode when the operation corresponding to the interrupt in the temporary return mode completes. Thus, power consumption can be decreased as the ink jet record apparatus is returned to the power saving mode when the operation corresponding to the interrupt (the maintenance operation or the predetermined operation) completes.

Power consumption can be decreased as the ink jet record apparatus is returned to the power saving mode when the operation corresponding to the interrupt (the maintenance operation or the predetermined operation) completes. Therefore, the advantage that the whole power consumption of the ink jet record apparatus can be decreased still better is produced.

The ink jet record apparatus has: a connection portion that enables to connect to a communication line; and a reception portion that receives a signal via the communication line connected to the connection portion, wherein the predetermined operation involves reception of image data by the reception portion.

When the reception portion receives image data via the communication line connected to the connection portion, the record head can form an image on a record medium based on the image data. The predetermined operation involves reception of the image data by the reception portion.

The predetermined operation involves reception of the image data by the reception portion. To receive image data and form an image corresponding to the image data, comparatively large noise occurs. The user may want to receive such image data without delay even during the power saving mode. Such operation is involved as the predetermined operation, so that the advantage that the user can specify whether or not the predetermined operation is permitted as he or she desires becomes still more noticeable.

The ink jet record apparatus has: a storage portion that stores a sound signal received by the reception portion, wherein the predetermined operation involves storage of the sound signal by the storage portion.

The predetermined operation involves the operation of the storage portion to store the sound signal received by the reception portion.

The predetermined operation involves the operation for the storage portion to store the sound signal received by the reception portion. The user may want to permit or inhibit storage of such a sound signal during the power saving mode according to user's preference. Therefore, the advantage that the user can specify whether or not the predetermined operation is permitted as he or she desires becomes still more noticeable. The first mode setting portion enables to switch from the temporary return mode to the usual power mode, and when a new sound signal is stored into the storage portion in the temporary return mode, the first mode setting portion switches from the temporary return mode to the usual power mode.

When the storage portion stores a new sound signal in the temporary return mode, the first mode setting portion switches from the temporary return mode to the usual power mode. In the usual power mode, the user can be easily notified of various events and occurrence of an alarm and can also be notified still more reliably that a new sound signal is stored as described above.

When the storage portion stores a new sound signal, the ink jet record apparatus switches to the usual power mode, and the user can be easily notified of various events and occurrence of an alarm. Therefore, the advantage that the user can be notified still more reliably that a new sound signal is stored as described above is produced.

The ink jet record apparatus has: a transmission portion that transmits image data via the communication line at a preset time, wherein the predetermined operation involves the operation of the transmission portion.

If the inhibition mode is set, the transmission portion is inhibited from transmitting image data via the communication line even if the preset time is reached during the power saving mode.

If the inhibition mode is set, the transmission portion is inhibited from transmitting image data via the communication line even if the preset time is reached during the power saving mode. To transmit image data in such a manner, comparatively large noise occurs. As the inhibition mode is set, the transmission operation during the power saving mode Is inhibited, so that the advantage that noise can be reduced still better when the inhibition mode is set is produced.

When the first mode setting portion switches from the power saving mode to the usual power mode, the transmission portion transmits image data which is not transmitted at time of exceeding the preset time via the communication line.

If the switch portion switches from the power saving mode to the usual power mode, the transmission portion transmits the image data which is not transmitted at time of exceeding the preset time via the communication line.

As the first mode setting portion switches from the power saving mode into the usual power mode, automatically the transmission portion can transmit the image data exceeding the preset time for the transmission portion via the communication line. Thus, the image data can be transmitted immediately when the ink jet record apparatus is switched to the usual power mode in which the necessity for suppressing noise is small. Therefore, the advantage that the image data to be transmitted by the transmission portion can be transmitted as early as possible while noise during the power saving mode is suppressed is produced.

The ink jet record apparatus has: a transmission portion that transmits image data via the communication line at a preset time, wherein the predetermined operation does not involve the operation of the transmission portion.

Even if the inhibition mode is set, the transmission portion transmits the image data via the communication line when the preset time is reached.

Even if the inhibition mode is set during the power saving mode, the transmission portion transmits the image data via the communication line when the preset time is reached. The user may want to transmit image data in such a manner without delay. Even if the inhibition mode is set, the transmission operation is performed at the preset time, so that the advantage that the transmission operation can be performed without delay at the preset time is produced.

The ink jet record apparatus has: a detection portion that detects the amount of ink stored in the ink jet record apparatus, wherein the mode transition control portion enables to switch from the temporary return mode to the usual power mode, and if the detection portion detects that the amount of ink is less than a reference amount before the maintenance portion executes the maintenance operation in the temporary return mode, the first mode setting portion switches from the temporary return mode to the usual power mode.

The detection portion detects the amount of ink stored in the ink jet record apparatus. If the detection portion detects that the ink amount is less than the reference amount before the maintenance portion executes the maintenance operation in the temporary return mode, the first mode setting portion switches from the temporary return mode to the usual power mode. In the usual power mode, the user can be easily notified of various events and occurrence of an alarm and can also be notified still more reliably that the ink amount becomes less than the reference amount as described above.

If the ink amount becomes less than the reference amount, the ink jet record apparatus is switched to the usual power mode, and the user can be easily notified of various events and occurrence of an alarm. Therefore, the advantage that the user can be notified still more reliably that the ink amount becomes less than the reference amount as described above is produced.

If the detection portion detects that the amount of ink is less than the reference amount, the maintenance portion does not execute the maintenance operation.

When the ink amount is less than the reference amount, if the maintenance operation is executed, there is a possibility that the record head will be adversely affected. Then, if the detection portion detects that the ink amount is less than the reference amount, the maintenance portion does not execute the maintenance operation.

If the detection portion detects that the ink amount is less than the reference amount, the maintenance portion does not execute the maintenance operation. Thus, the advantage that the record head can be protected still better is produced.

The maintenance operation executed by the maintenance portion includes a first maintenance mode at a predetermined noise level and a second maintenance mode at a lower noise level than the first maintenance mode, and when the inhibition mode is set, the maintenance portion executes the maintenance operation in the second maintenance mode.

The maintenance portion includes the first maintenance mode at a predetermined noise level and the second maintenance mode at a lower noise level than the first maintenance mode. When the inhibition mode is set, the maintenance portion executes the maintenance operation in the second maintenance mode.

When the inhibition mode is set, the maintenance portion executes the maintenance operation in the second maintenance mode at low noise level. Thus, the advantage that noise reduction when the inhibition mode is set can be still better enhanced is produced.

The maintenance operation executed by the maintenance portion includes a first maintenance mode at a predetermined noise level and a second maintenance mode at a lower noise level than the first maintenance mode, and when the power saving mode is set, the maintenance portion executes the maintenance operation in the second maintenance mode.

The maintenance portion includes the first maintenance mode at a predetermined noise level and the second maintenance mode at a lower noise level than the first maintenance mode. During the power saving mode, the maintenance portion executes the maintenance operation in the second maintenance mode.

During the power saving mode, the maintenance portion executes the maintenance operation in the second maintenance mode at low noise level. Thus, the advantage that noise reduction during the power saving mode can be still better enhanced is produced.

The ink jet record apparatus has: a carriage that moves the record head with respect to a record medium, wherein a moving speed of the carriage in the second maintenance mode is slower than a moving speed of the carriage in the first maintenance mode.

During the second maintenance mode, the moving speed of the carriage which moves the record head with respect to a record medium is slower than a moving speed of the carriage in the first maintenance mode, so that noise accompanying a move of the carriage is reduced.

During the second maintenance mode, the moving speed of the carriage is slower than a moving speed of the carriage in the first maintenance mode. Thus, the advantage that noise reduction when the inhibition mode is set or during the power saving mode can be still better enhanced is produced.

The maintenance portion has a suction pump that applies a negative pressure to the nozzle of the record head for performing suction operation, and a driving speed of the suction pump in the second maintenance mode is slower than a driving speed of the suction pump in the first maintenance mode.

During the second maintenance mode, the driving speed of the suction pump which applies a negative pressure to the nozzle of the record head is slower than a driving speed of the suction pump in the first maintenance mode, so that noise accompanying driving of the carriage is reduced.

During the second maintenance mode, the driving speed of the suction pump is slower than a driving speed of the carriage in the first maintenance mode. Thus, the advantage that noise reduction when the inhibition mode is set or during the power saving mode can be still better enhanced is produced.

The ink jet record apparatus has: a display portion that displays various types of messages, wherein during the power saving mode, the display portion is inhibited from displaying.

During the power saving mode, the display portion is inhibited from displaying, so that power consumption can be decreased still more.

During the power saving mode, the display portion is inhibited from displaying, so that power consumption can be decreased still more. Therefore, the advantage that the whole power consumption of the ink jet record apparatus can be decreased still better is produced.

The first mode setting portion sets a mode according to an instruction from a software power key disposed on the ink jet record apparatus.

The first mode setting portion sets a mode according to an instruction from the software power key disposed on the ink jet record apparatus, so that the ink jet record apparatus can be extremely easily switched between the usual power mode and the power saving mode.

The first mode setting portion sets a mode according to an instruction from the software power key disposed on the ink jet record apparatus, so that the ink jet record apparatus can be extremely easily switched between the usual power mode and the power saving mode. Therefore, the advantage that the operability of the apparatus can be improved still better is produced.

The mode setting program operates the computer as: a interrupt recognition portion that recognizes a first interrupt to execute the maintenance operation and a second interrupt to execute the predetermined operation, wherein the first mode setting portion that enables to switch between the power saving mode and a temporary return mode in which the maintenance operation and the predetermined operation can be executed, the temporary return mode being different from the usual power mode, during the permission mode, the first mode setting portion switches from the power saving mode to the temporary return mode only if the interrupt recognition portion recognizes the first interrupt or the second interrupt, and during the inhibition mode, the first mode setting portion switches from the power saving mode to the temporary return mode only if the interrupt recognition portion recognizes the first interrupt.

The maintenance operation executed by the maintenance portion includes a first maintenance mode at a predetermined noise level and a second maintenance mode at a lower noise level than the first maintenance mode, and when the inhibition mode is set, the maintenance portion executes the maintenance operation in the second maintenance mode.

What is claimed is:

1. An ink jet record apparatus comprising:

a record head that ejects ink from a nozzle to form an image on a record medium;

a maintenance portion that executes maintenance operation to prevent drying of the nozzle at regular time intervals when image formation is not executed;

a first mode setting portion that sets the ink jet record apparatus on a usual power mode in which usual power is consumed or a power saving mode in which power supply to other parts than those required for returning to the usual power mode is reduced; and a second mode setting portion that sets, during the power saving mode, the ink jet record apparatus on a permission mode in which the maintenance operation and predetermined operation other than the maintenance operation are permitted or an inhibition mode in which the predetermined operation is inhibited although the maintenance operation is permitted.

2. The ink jet record apparatus according to claim 1, further comprising:

a connection portion that enables to connect to a communication line; and a reception portion that receives a signal via the communication line connected to the connection portion, wherein the predetermined operation involves reception of image data by the reception portion.

3. The ink jet record apparatus according to claim 2, further comprising:

a storage portion that stores a sound signal received by the reception portion, wherein the predetermined operation involves storage of the sound signal by the storage portion.

4. The ink jet record apparatus according to claim 1, further comprising:

an interrupt recognition portion that recognizes a first interrupt to execute the maintenance operation and a second interrupt to execute the predetermined operation, wherein the first mode setting portion that enables switching between the power saving mode and a temporary return mode in which the maintenance operation and the predetermined operation can be executed, the temporary return mode being different from the usual power mode, during the permission mode, the first mode setting portion switches from the power saving mode to the temporary return mode only if the interrupt recognition portion recognizes the first interrupt or the second interrupt, and during the inhibition mode, the first mode setting portion switches from the power saving mode to the temporary return mode only if the interrupt recognition portion recognizes the first interrupt.

5. The ink jet record apparatus according to claim 4, wherein the first mode setting portion switches from the temporary return mode to the power saving mode when the operation corresponding to the interrupt in the temporary return mode completes.

6. The ink jet record apparatus according to claim 4, further comprising:

a connection portion that enables to connect to a communication line; and a reception portion that receives a signal via the communication line connected to the connection portion, wherein the predetermined operation involves reception of image data by the reception portion.

7. The ink jet record apparatus according to claim 6, further comprising:

a storage portion that stores a sound signal received by the reception portion, wherein the predetermined operation involves storage of the sound signal by the storage portion.

8. The ink jet record apparatus according to claim 7, wherein the first mode setting portion enables switching from the temporary return mode to the usual power mode, and when a new sound signal is stored into the storage portion in the temporary return mode, the first mode setting portion switches from the temporary return mode to the usual power mode.

9. The ink jet record apparatus according to claim 6, further comprising:

a transmission portion that transmits image data via the communication line at a preset time, wherein the predetermined operation involves the operation of the transmission portion.

10. The ink jet record apparatus according to claim 9, wherein when the first mode setting portion switches from the power saving mode to the usual power mode, the transmission portion transmits image data which is not transmitted at time of exceeding the preset time via the communication line

11. The ink jet record apparatus according to claim 6, further comprising:

a transmission portion that transmits image data via the communication line at a preset time, wherein the predetermined operation does not involve the operation of the transmission portion.

12. The ink jet record apparatus according to claim 4, further comprising:

a detection portion that detects the amount of ink stored in the ink jet record apparatus, wherein the mode transition control portion enables switching from the temporary return mode to the usual power mode, and if the detection portion detects that the amount of ink is less than a reference amount before the maintenance portion executes the maintenance operation in the temporary return mode, the first mode setting portion switches from the temporary return mode to the usual power mode.

13. The ink jet record apparatus according to claim 12, wherein if the detection portion detects that the amount of ink is less than the reference amount, the maintenance portion does not execute the maintenance operation.

14. The ink jet record apparatus according to claim 4, wherein the maintenance operation executed by the maintenance portion includes a first maintenance mode at a predetermined noise level and a second maintenance mode at a lower noise level than the first maintenance mode, and when the inhibition mode is set, the maintenance portion executes the maintenance operation in the second maintenance mode.

15. The ink jet record apparatus according to claim 14, further including:

a carriage that moves the record head with respect to a record medium, wherein a moving speed of the carriage in the second maintenance mode is slower than a moving speed of the carriage in the first maintenance mode.

16. The ink jet record apparatus according to claim 14, wherein the maintenance portion comprises a suction pump that applies a negative pressure to the nozzle of the record head for performing suction operation, and a driving speed of the suction pump in the second maintenance mode is slower than a driving speed of the suction pump in the first maintenance mode.

17. The ink jet record apparatus according to claim 4, wherein the maintenance operation executed by the maintenance portion includes a first maintenance mode at a predetermined noise level and a second maintenance mode at a lower noise level than the first maintenance mode, and when the power saving mode is set, the maintenance portion executes the maintenance operation in the second maintenance mode.

18. The ink jet record apparatus according to claim 15, further including:

a carriage that moves the record head with respect to a record medium, wherein a moving speed of the carriage in the second maintenance mode is slower than a moving speed of the carriage in the first maintenance mode.

19. The ink jet record apparatus according to claim 1, further comprising:

a display portion that displays various types of messages, wherein during the power saving mode, the display portion is inhibited from displaying.

20. The ink jet record apparatus according to claim 1, wherein the first mode setting portion sets a mode according to an instruction from a software power key disposed on the ink jet record apparatus.

21. A mode switching method of switching a mode of an ink jet record apparatus which executes maintenance operation to prevent drying of a nozzle when image formation is not executed, comprising the steps of:

determining whether the ink jet record apparatus is set to either a usual power mode in which usual power is consumed or a power saving mode in which power supply to other parts than those required for returning to the usual power mode is reduced;

determining, during the power saving mode, whether the ink jet record apparatus is set to either a permission mode in which the maintenance operation and predetermined operation other than the maintenance operation are permitted or an inhibition mode in which the predetermined operation is inhibited although the maintenance operation is permitted during the power saving mode;

recognizing a first interrupt to execute the maintenance operation and a second interrupt to execute the predetermined operation;

switching from the power saving mode to a temporary return mode in which the maintenance operation and the predetermined operation can be executed, the temporary return mode being different from the usual power mode, only if the first interrupt or the second interrupt is recognized during the permission mode; and switching from the power saving mode to the temporary return mode only if the first interrupt is recognized during the inhibition mode.

22. A computer-readable medium having a computer program stored thereon and readable by a computer, said computer program, when executed by the computer, causes the computer to perform operations for an ink jet record apparatus that comprises:

a record head that ejects ink from a nozzle to form an image on a record medium; and a maintenance portion that executes maintenance operation to prevent drying of the nozzle at regular time intervals when image formation is not executed, said operations comprising:

setting, by a first mode setting portion, the ink jet record apparatus on a usual power mode in which usual power is consumed or a power saving mode in which power supply to other parts than those required for returning to the usual power mode is reduced; and during the power saving mode, setting, by a second mode setting portion, the ink jet record apparatus on a permission mode in which the maintenance operation and predetermined operation other than the maintenance operation are permitted or an inhibition mode in which the predetermined operation is inhibited although the maintenance operation is permitted.

23. The computer-readable medium according to claim 22, wherein said operations further comprise:

recognizing a first interrupt to execute the maintenance operation and a second interrupt to execute the predetermined operation, wherein the first mode setting portion that enables switching between the power saving mode and a temporary return mode in which the maintenance operation and the predetermined operation can be executed, the temporary return mode being different from the usual power mode, during the permission mode, the first mode setting portion switches from the power saving mode to the temporary return mode only if the interrupt recognition portion recognizes the first interrupt or the second interrupt, and during the inhibition mode, the first mode setting portion switches from the power saving mode to the temporary return mode only if the interrupt recognition portion recognizes the first interrupt.

24. The computer-readable medium according to claim 23, wherein the maintenance operation executed by the maintenance portion includes a first maintenance mode at a predetermined noise level and a second maintenance mode at a lower noise level than the first maintenance mode, and when the inhibition mode is set, the maintenance portion executes the maintenance operation in the second maintenance mode.

* * * * *